US010323955B2

(12) United States Patent
Santilli et al.

(10) Patent No.: US 10,323,955 B2
(45) Date of Patent: *Jun. 18, 2019

(54) VIEWING, MODIFYING, AND/OR CREATING ROUTES

(71) Applicant: United Parcel Service of America, Inc., Atlanta, GA (US)

(72) Inventors: Robert Santilli, York, PA (US); Steve Snyder, Bel Air, MD (US); Elisabeth Defronzo, Ellicott City, MD (US); Svetlana Inskeep, Baldwin, MD (US); Joel Tantzer, York, PA (US); Karen Levin, Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 41 days.

This patent is subject to a terminal disclaimer.

(21) Appl. No.: 15/392,105

(22) Filed: Dec. 28, 2016

(65) Prior Publication Data

US 2017/0108349 A1     Apr. 20, 2017

Related U.S. Application Data

(63) Continuation of application No. 15/343,837, filed on Nov. 4, 2016, which is a continuation of application
(Continued)

(51) Int. Cl.
*G01C 21/36*     (2006.01)
*G01C 21/34*     (2006.01)
(Continued)

(52) U.S. Cl.
CPC ....... *G01C 21/3697* (2013.01); *G01C 21/343* (2013.01); *G01C 21/36* (2013.01); *G01C 21/3605* (2013.01); *G01C 21/3614* (2013.01); *G01C 21/3664* (2013.01); *G01C 21/3673* (2013.01); *G01C 21/3676* (2013.01);
(Continued)

(58) Field of Classification Search
None
See application file for complete search history.

(56) References Cited

U.S. PATENT DOCUMENTS 6,282,489 B1    8/2001    Bellesfield et al.
6,321,158 B1    11/2001    DeLorme et al.
(Continued)

OTHER PUBLICATIONS

U.S. Appl. No. 15/343,837, "Viewing, Modifying, and/or Creating Routes", Unpublished (filed Nov. 4, 2016), (Robert Santilli, Inventor), (United Parcel Service of America, Inc., Assignee).
(Continued)

*Primary Examiner* — Tamara L Weber
(74) *Attorney, Agent, or Firm* — Shook, Hardy & Bacon L.L.P.

(57) ABSTRACT

Computer program products, methods, systems, apparatus, and computing entities are provided for creating, modifying, and viewing geographic areas and their corresponding routes and items of work. For example, an interface can be provided with a map display area and a route display area. The map display area and the route display area can be synchronized to create new routes, modify existing routes, and/or view information about various routes and/or items of work.

18 Claims, 13 Drawing Sheets

Related U.S. Application Data

No. 14/637,873, filed on Mar. 4, 2015, now Pat. No. 9,513,136.

(51) Int. Cl.
  *G06Q 10/08* (2012.01)
  *G06F 16/29* (2019.01)
(52) U.S. Cl.
  CPC ... *G06Q 10/0833* (2013.01); *G06Q 10/08355* (2013.01); *G06F 16/29* (2019.01)

(56) References Cited

U.S. PATENT DOCUMENTS

| | | | |
|---|---|---|---|
| 7,373,244 B2 | 5/2008 | Kreft | |
| 7,706,937 B2 | 4/2010 | Hasegawa et al. | |
| 8,510,043 B1 | 8/2013 | Whiton et al. | |
| 9,109,904 B2 | 8/2015 | Forstall et al. | |
| 9,506,771 B2 | 11/2016 | Santilli et al. | |
| 9,506,772 B2 | 11/2016 | Santilli et al. | |
| 9,513,136 B2 | 12/2016 | Santilli et al. | |
| 2002/0052688 A1 | 5/2002 | Yofu | |
| 2002/0171650 A1* | 11/2002 | Prabhakaran | G08G 1/20 345/530 |
| 2002/0188702 A1* | 12/2002 | Short, III | G01C 21/36 709/220 |
| 2004/0001114 A1* | 1/2004 | Fuchs | G01C 21/36 715/855 |
| 2009/0015595 A1* | 1/2009 | Fuchs | G01C 21/32 345/619 |
| 2011/0320114 A1* | 12/2011 | Buxton | G01C 21/3608 701/439 |
| 2013/0304349 A1 | 11/2013 | Davidson | |
| 2013/0325320 A1 | 12/2013 | Dimitriadis | |
| 2013/0345961 A1 | 12/2013 | Leader et al. | |
| 2014/0358437 A1 | 12/2014 | Fletcher | |
| 2014/0372025 A1 | 12/2014 | Yoshida | |
| 2015/0178649 A1 | 6/2015 | Furman et al. | |
| 2016/0003637 A1 | 1/2016 | Andersen | |
| 2017/0330193 A1* | 11/2017 | Tolson | H04L 67/42 |

OTHER PUBLICATIONS

U.S. Appl. No. 15/392,121, "Viewing, Modifying, and/or Creating Routes", Unpublished (filed Dec. 28, 2016), (Robert Santilli, Inventor), (United Parcel Service of America, Inc., Assignee).
United States Patent and Trademark Office, Notice of Allowance for U.S. Appl. No. 14/638,342, dated Jul. 26, 2016, 5 pages, U.S.A.
United States Patent and Trademark Office, Notice of Allowance for U.S. Appl. No. 14/638,036, dated Jul. 27, 2016, 5 pages, U.S.A.
United States Patent and Trademark Office, Notice of Allowance for U.S. Appl. No. 14/637,873, dated Aug. 2, 2016, 5 pages, U.S.A.
United States Patent and Trademark Office, Office Action for U.S. Appl. No. 14/637,873, dated Feb. 22, 2016, 18 pages, U.S.A.
United States Patent and Trademark Office, Office Action for U.S. Appl. No. 14/638,342, dated Feb. 9, 2016, 15 pages, U.S.A.
United States Patent and Trademark Office, Office Action for U.S. Appl. No. 14/638,036, dated Feb. 3, 2016, 13 pages, U.S.A.
United States Patent and Trademark Office, Office Action for U.S. Appl. No. 14/638,342, dated Jun. 30, 2016, 7 pages, U.S.A.
United States Patent and Trademark Office, Office Action for U.S. Appl. No. 14/638,036, dated Jun. 30, 2016, 7 pages, U.S.A.
United States Patent and Trademark Office, Office Action for U.S. Appl. No. 14/637,873, dated Jul. 1, 2016, 8 pages, U.S.A.
Requisition by the Examiner for Application No. 2,921,862, dated Mar. 28, 2017, Canadian Intellectual Property Office, Canada, 4.

* cited by examiner

US 10,323,955 B2

VIEWING, MODIFYING, AND/OR CREATING ROUTES

CROSS-REFERENCE TO RELATED APPLICATIONS

This application is a continuation of U.S. application Ser. No. 15/343,837, filed Nov. 4, 2016, which is a continuation of U.S. application Ser. No. 14/637,873, filed Mar. 4, 2015, the contents of both of which are hereby incorporated herein in their entirety by reference.

BACKGROUND

New techniques and approaches are needed for more intuitively creating, modifying, and viewing geographic areas and their corresponding routes and items of work.

BRIEF SUMMARY

In general, embodiments of the present invention provide methods, apparatus, systems, computing devices, computing entities, and/or the like.

In accordance with one aspect, a method is provided. In one embodiment, the method comprises (1) providing an interface comprising a map display area and a route display area, wherein (a) the map display area comprises a digital map with a plurality of items of work represented on the digital map and (b) the route display area comprises a row for each of the plurality of items of work; (2) receiving input selecting one or more of the plurality items of work; and (3) responsive to receiving the input selecting the one or more of the plurality of items of work, causing simultaneous display of information associated with the one or more of the plurality items of work in the map display area and the route display area.

In accordance with another aspect, a computer program product is provided. The computer program product may comprise at least one computer-readable storage medium having computer-readable program code portions stored therein, the computer-readable program code portions comprising executable portions configured to (1) provide an interface comprising a map display area and a route display area, wherein (a) the map display area comprises a digital map with a plurality of items of work represented on the digital map and (b) the route display area comprises a row for each of the plurality of items of work; (2) receive input selecting one or more of the plurality items of work; and (3) responsive to receiving the input selecting the one or more of the plurality of items of work, cause simultaneous display of information associated with the one or more of the plurality items of work in the map display area and the route display area.

In accordance with yet another aspect, an apparatus comprising at least one processor and at least one memory including computer program code is provided. In one embodiment, the at least one memory and the computer program code may be configured to, with the processor, cause the apparatus to (1) provide an interface comprising a map display area and a route display area, wherein (a) the map display area comprises a digital map with a plurality of items of work represented on the digital map and (b) the route display area comprises a row for each of the plurality of items of work; (2) receive input selecting one or more of the plurality items of work; and (3) responsive to receiving the input selecting the one or more of the plurality of items of work, cause simultaneous display of information associated with the one or more of the plurality items of work in the map display area and the route display area.

In accordance with one aspect, a method is provided. In one embodiment, the method comprises (1) receiving input identifying a geographic area in which to create a new route; (2) causing display of at least a portion of the geographic area via a map display area of an interface, wherein (a) the interface comprises the map display area and a route display area, (b) the map display area comprises a digital map with a plurality of items of work represented on the digital map, and (c) the route display area comprises a row for each of the plurality of items of work; (3) receiving input selecting one or more of the plurality of items of work in the geographic area for the new route; and (4) responsive to receiving the input selecting the one or more of the plurality of items of work in the geographic area for the new route, assigning the items of work in the geographic area to the new route.

In accordance with another aspect, a computer program product is provided. The computer program product may comprise at least one computer-readable storage medium having computer-readable program code portions stored therein, the computer-readable program code portions comprising executable portions configured to (1) receive input identifying a geographic area in which to create a new route; (2) cause display of at least a portion of the geographic area via a map display area of an interface, wherein (a) the interface comprises the map display area and a route display area, (b) the map display area comprises a digital map with a plurality of items of work represented on the digital map, and (c) the route display area comprises a row for each of the plurality of items of work; (3) receive input selecting one or more of the plurality of items of work in the geographic area for the new route; and (4) responsive to receiving the input selecting the one or more of the plurality of items of work in the geographic area for the new route, assign the items of work in the geographic area to the new route.

In accordance with yet another aspect, an apparatus comprising at least one processor and at least one memory including computer program code is provided. In one embodiment, the at least one memory and the computer program code may be configured to, with the processor, cause the apparatus to (1) receive input identifying a geographic area in which to create a new route; (2) cause display of at least a portion of the geographic area via a map display area of an interface, wherein (a) the interface comprises the map display area and a route display area, (b) the map display area comprises a digital map with a plurality of items of work represented on the digital map, and (c) the route display area comprises a row for each of the plurality of items of work; (3) receive input selecting one or more of the plurality of items of work in the geographic area for the new route; and (4) responsive to receiving the input selecting the one or more of the plurality of items of work in the geographic area for the new route, assign the items of work in the geographic area to the new route.

In accordance with one aspect, a method is provided. In one embodiment, the method comprises (1) receiving input identifying a first route from which to move one or more items of work and a second route to which to move the one or more items of work; (2) causing display of at least a portion of the one or more items of work via a map display are of an interface and a route display area of the interface, wherein (a) the map display area comprises a digital map with the one or more items of work represented on the digital map and (c) the route display area comprises a row for each of the one or more items of work; (3) receiving input selecting at least one of the one or more items of work to move from the first route to the second route; and (4) responsive to receiving the input selecting at least one of the one or more items of work to move from the first route to the second route input, moving the at least one of the one or more items of work from the first route to the second route.

In accordance with another aspect, a computer program product is provided. The computer program product may comprise at least one computer-readable storage medium having computer-readable program code portions stored therein, the computer-readable program code portions comprising executable portions configured to (1) receive input identifying a first route from which to move one or more items of work and a second route to which to move the one or more items of work; (2) cause display of at least a portion of the one or more items of work via a map display are of an interface and a route display area of the interface, wherein (a) the map display area comprises a digital map with the one or more items of work represented on the digital map and (c) the route display area comprises a row for each of the one or more items of work; (3) receive input selecting at least one of the one or more items of work to move from the first route to the second route; and (4) responsive to receiving the input selecting at least one of the one or more items of work to move from the first route to the second route input, move the at least one of the one or more items of work from the first route to the second route.

In accordance with yet another aspect, an apparatus comprising at least one processor and at least one memory including computer program code is provided. In one embodiment, the at least one memory and the computer program code may be configured to, with the processor, cause the apparatus to (1) receive input identifying a first route from which to move one or more items of work and a second route to which to move the one or more items of work; (2) cause display of at least a portion of the one or more items of work via a map display are of an interface and a route display area of the interface, wherein (a) the map display area comprises a digital map with the one or more items of work represented on the digital map and (c) the route display area comprises a row for each of the one or more items of work; (3) receive input selecting at least one of the one or more items of work to move from the first route to the second route; and (4) responsive to receiving the input selecting at least one of the one or more items of work to move from the first route to the second route input, move the at least one of the one or more items of work from the first route to the second route.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DESCRIPTION

Figure 1:
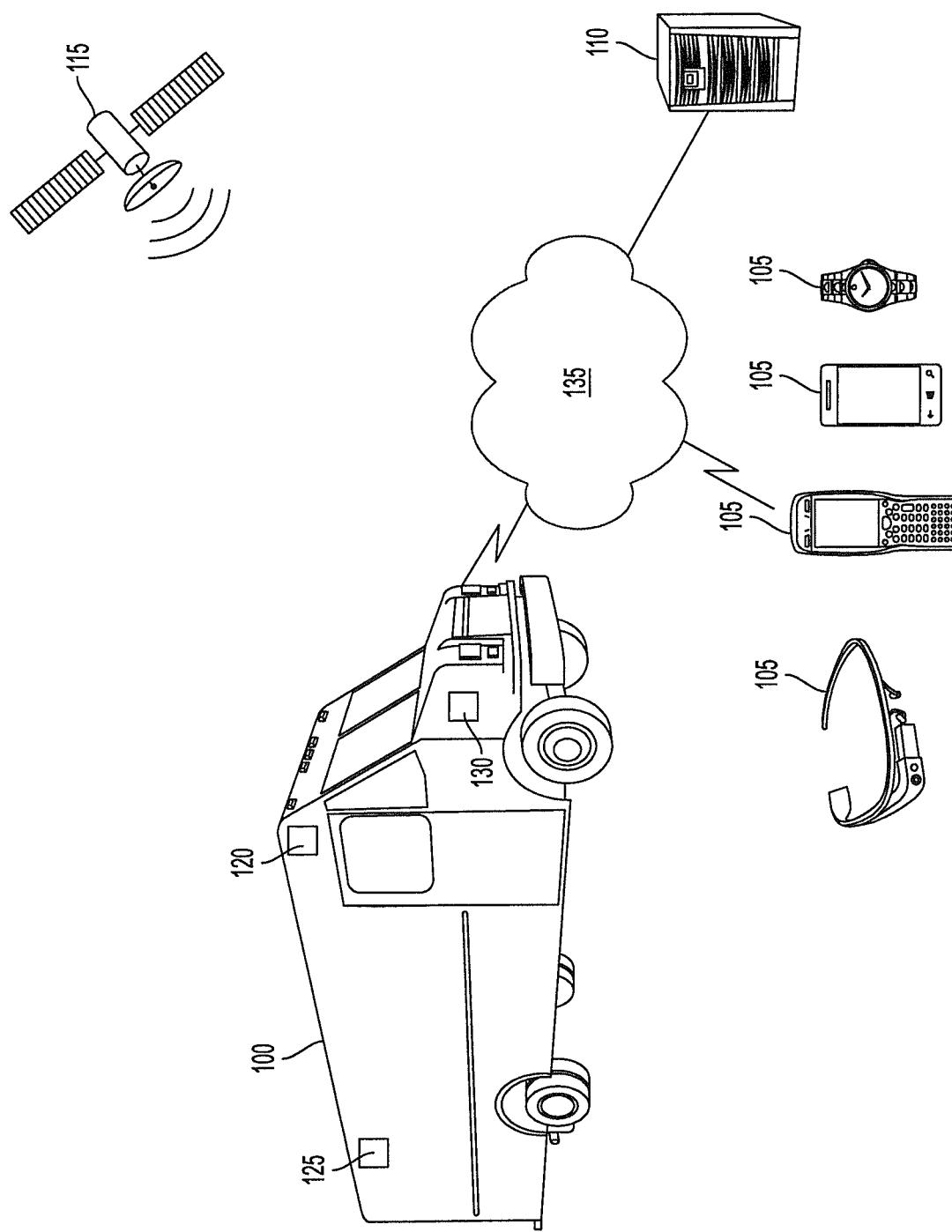
FIG. 1 is a diagram of a system that can be used to practice various embodiments of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. Computer Program Products, Methods, And Computing Entities

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Exemplary System Architecture

FIG. 1 provides an illustration of a system that can be used in conjunction with various embodiments of the present invention. As shown in FIG. 1, the system may include one or more vehicles 100, one or more mobile computing entities 105, one or more mapping/routing computing entities 110, one or more Global Positioning System (GPS) satellites 115, one or more location sensors 120, one or more telematics sensors 125, one or more data collection devices 130, one or more networks 135, one or more user computing entities 140 (not shown), and/or the like. Each of the components of the system may be in electronic communication with, for example, one another over the same or different wireless or wired networks including, for example, a wired or wireless Personal Area Network (PAN), Local Area Network (LAN), Metropolitan Area Network (MAN), Wide Area Network (WAN), or the like. Additionally, while FIG. 1 illustrates certain system entities as separate, standalone entities, the various embodiments are not limited to this particular architecture.

a. Exemplary Vehicle

In various embodiments, the term vehicle 100 is used generically. For example, a vehicle 100 may be a tractor, a truck, a car, a motorcycle, a moped, a Segway, a bicycle, a golf cart, a hand truck, a cart, a trailer, a tractor and trailer combination, a van, a flatbed truck, a vehicle, drone, airplane, helicopter, and/or any other form of object for moving or transporting people and/or items (e.g., one or more packages, parcels, bags, containers, loads, crates, items banded together, vehicle parts, pallets, drums, the like, and/or similar words used herein interchangeably). Although in certain embodiments, the vehicle may be unmanned. In one embodiment, each vehicle 100 may be associated with a unique vehicle identifier (such as a vehicle ID) that uniquely identifies the vehicle 100. The unique vehicle ID (e.g., trailer ID, tractor ID, vehicle ID, and/or the like) may include characters, such as numbers, letters, symbols, and/or the like. For example, an alphanumeric vehicle ID (e.g., "AS445") may be associated with each vehicle 100. In another embodiment, the unique vehicle ID may be the license plate, registration number, or other identifying information/data assigned to or associated with the vehicle 100.

Figure 2:
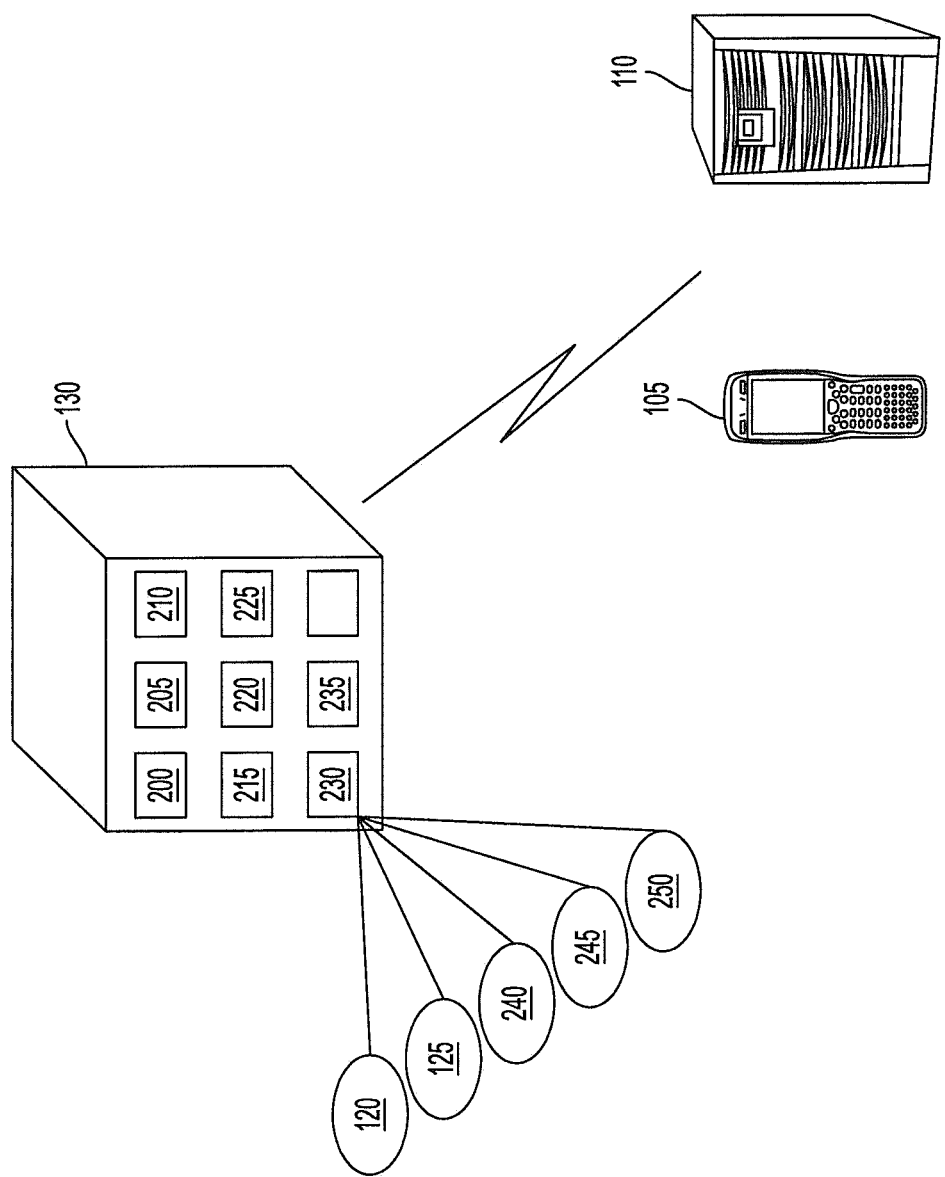
FIG. 2 is a diagram of a data collection device that may be used in association with certain embodiments of the present invention.

FIG. 1 shows one or more computing entities, devices, and/or similar words used herein interchangeably that are associated with the vehicle 100, such as a data collection device 130 or other computing entities. In general, the terms computing entity, entity, device, system, and/or similar words used herein interchangeably may refer to, for example, one or more computers, computing entities, mobile phones, desktops, tablets, notebooks, laptops, distributed systems, gaming consoles (e.g., Xbox, Play Station, Wii), watches, televisions, dongles, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. FIG. 2 provides a block diagram of an exemplary data collection device 130 that may be attached, affixed, disposed upon, integrated into, or part of a vehicle 100. The data collection device 130 may collect telematics information/data (including location information/data) and transmit/send the data to the mobile computing entity 105, the mapping/routing computing entity 110, and/or various other computing entities via one of several communication methods. Telematics information/data may be generally referred to herein as information/data.

In one embodiment, the data collection device 130 may include, be associated with, or be in communication with one or more processors 200 (various exemplary processors are described in greater detail below), one or more location-determining devices or one or more location sensors 120 (e.g., Global Navigation Satellite System (GNSS) sensors), one or more telematics sensors 125, one or more real-time clocks 215, a J-Bus protocol architecture, one or more electronic control modules (ECM) 245, one or more communication ports 230 for receiving telematics information/data from various sensors (e.g., via a CAN-bus), one or more communication ports 205 for transmitting/sending information/data, one or more RFID tags/sensors 250, one or more power sources 220, one or more data radios 235 for communication with a variety of communication networks, one or more memory modules 210, and one or more programmable logic controllers (PLC) 225. It should be noted that many of these components may be located in the vehicle 100 but external to the data collection device 130.

In one embodiment, the one or more location sensors 120, modules, or similar words used herein interchangeably may be one of several components in communication with or available to the data collection device 130. Moreover, the one or more location sensors 120 may be compatible with GPS satellites 115, such as Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, triangulation may be used in connection with a device associated with a particular vehicle and/or the vehicle's operator and with various communication points (e.g., cellular towers or Wi-Fi access points) positioned at various locations throughout a geographic area to monitor the location of the vehicle 100 and/or its operator. The one or more location sensors 120 may be used to receive latitude, longitude, altitude, heading or direction, geocode, course, position, time, and/or speed data (e.g., referred to herein as telematics information/data and further described herein below). The one or more location sensors 120 may also communicate with the mapping/routing computing entity 110, the data collection device 130, mobile computing entity 105, and/or similar computing entities.

As indicated, in addition to the one or more location sensors 120, the data collection device 130 may include and/or be associated with one or more telematics sensors 125, modules, and/or similar words used herein interchangeably. For example, the telematics sensors 125 may include vehicle sensors, such as engine, fuel, odometer, hubometer, tire pressure, location, weight, emissions, door, and speed sensors. The telematics information/data may include, but is not limited to, speed information/data, emissions information/data, RPM information/data, tire pressure information/data, oil pressure information/data, seat belt usage information/data, distance information/data, fuel information/data, idle information/data, and/or the like (e.g., referred to herein as telematics information/data). The telematics sensors 125 may include environmental sensors, such as air quality sensors, temperature sensors, and/or the like. Thus, the telematics information/data may also include carbon monoxide (CO), nitrogen oxides (NOx), sulfur oxides (SOx), Ethylene Oxide (EtO), ozone ($O_3$), hydrogen sulfide ($H_2S$) and/or ammonium ($NH_4$) information/data, and/or meteorological data (e.g., referred to herein as telematics information/data).

In one embodiment, the ECM 245 may be one of several components in communication with and/or available to the data collection device 130. The ECM 245, which may be a scalable and subservient device to the data collection device 130, may have data processing capability to decode and store analog and digital inputs from vehicle systems and sensors. The ECM 245 may further have data processing capability to collect and present telematics information/data to the J-Bus (which may allow transmission to the data collection device 130), and output standard vehicle diagnostic codes when received from a vehicle's J-Bus-compatible on-board controllers 240 and/or sensors.

As indicated, a communication port 230 may be one of several components available in the data collection device 130 (or be in or as a separate computing entity). Embodiments of the communication port 230 may include an Infrared data Association (IrDA) communication port, a data radio, and/or a serial port. The communication port 230 may receive instructions for the data collection device 130. These instructions may be specific to the vehicle 100 in which the data collection device 130 is installed, specific to the geographic area in which the vehicle 100 will be traveling, specific to the function the vehicle 100 serves within a fleet, and/or the like. In one embodiment, the data radio 235 may be configured to communicate with a wireless wide area network (WWAN), wireless local area network (WLAN), wireless personal area network (WPAN), or any combination thereof. For example, the data radio 235 may communicate via various wireless protocols, such as 802.11, general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, Bluetooth protocols (including Bluetooth low energy (BLE)), wireless universal serial bus (USB) protocols, and/or any other wireless protocol.

b. Exemplary Mapping/Routing Computing Entity

Figure 3:
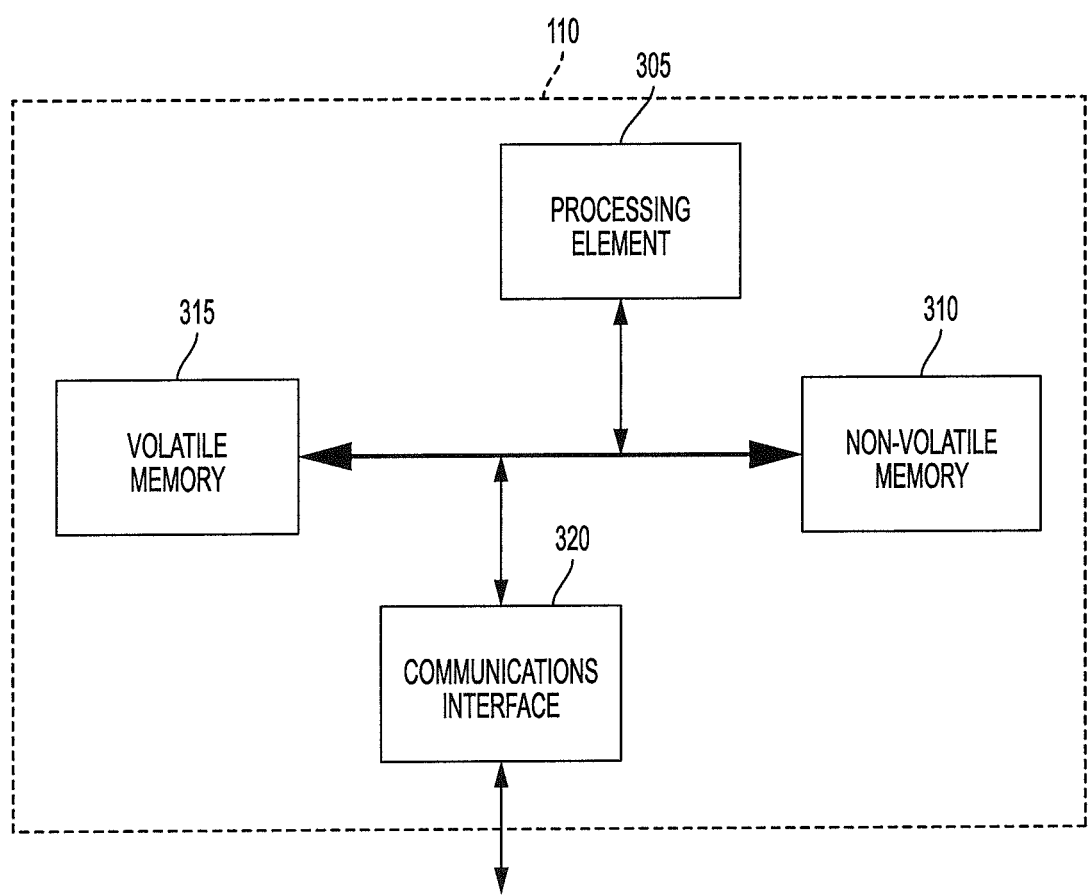
FIG. 3 is a schematic of a mapping/routing computing entity in accordance with certain embodiments of the present invention.

FIG. 3 provides a schematic of a mapping/routing computing entity 110 according to one embodiment of the present invention. In general, the terms computing entity, entity, device, system, and/or similar words used herein interchangeably may refer to, for example, one or more computers, computing entities, mobile phones, desktops, tablets, notebooks, laptops, distributed systems, gaming consoles (e.g., Xbox, Play Station, Wii), watches, glasses, key fobs, RFID tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on information/data, content, information, and/or similar terms used herein interchangeably.

As indicated, in one embodiment, the mapping/routing computing entity 110 may also include one or more communications interfaces 320 for communicating with various computing entities, such as by communicating information/data, content, information, and/or similar terms used herein interchangeably that can be transmitted, received, operated on, processed, displayed, stored, and/or the like. For instance, the mapping/routing computing entity 110 may communicate with vehicles 100, mobile computing entities 105, and/or the like.

As shown in FIG. 3, in one embodiment, the mapping/routing computing entity 110 may include or be in communication with one or more processing elements 305 (also referred to as processors, processing circuitry, and/or similar terms used herein interchangeably) that communicate with other elements within the mapping/routing computing entity 110 via a bus, for example. As will be understood, the processing element 305 may be embodied in a number of different ways. For example, the processing element 305 may be embodied as one or more complex programmable logic devices (CPLDs), microprocessors, multi-core processors, coprocessing entities, application-specific instruction-set processors (ASIPs), and/or controllers. Further, the processing element 305 may be embodied as one or more other processing devices or circuitry. The term circuitry may refer to an entirely hardware embodiment or a combination of hardware and computer program products. Thus, the processing element 305 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 305 may be configured for a particular use or configured to execute instructions stored in volatile or non-volatile media or otherwise accessible to the processing element 305. As such, whether configured by hardware or computer program products, or by a combination thereof, the processing element 305 may be capable of performing steps or operations according to embodiments of the present invention when configured accordingly.

In one embodiment, the mapping/routing computing entity 110 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 310 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, information/data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or data that is stored in a computer-readable storage medium, such as via a relational database, hierarchical database, and/or network database.

In one embodiment, the mapping/routing computing entity 110 may further include or be in communication with volatile media (also referred to as volatile storage, memory, memory storage, memory circuitry and/or similar terms used herein interchangeably). In one embodiment, the volatile storage or memory may also include one or more volatile storage or memory media 315 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, information/data, applications, programs, program modules, scripts, source code, object code, byte code, compiled code, interpreted code, machine code, executable instructions, and/or the like being executed by, for example, the processing element 305. Thus, the databases, database instances, database management system entities, information/data, applications, programs, program modules, scripts, source code, object code, byte code, compiled code, interpreted code, machine code, executable instructions, and/or the like may be used to control certain aspects of the operation of the mapping/routing computing entity 110 with the assistance of the processing element 305, an operating system, and a mapping/routing platform.

As indicated, in one embodiment, the mapping/routing computing entity 110 may also include one or more communications interfaces 320 for communicating with various computing entities, such as by communicating information/data, content, information, and/or similar terms used herein interchangeably that can be transmitted, received, operated on, processed, displayed, stored, and/or the like. For instance, the mapping/routing computing entity 110 may communicate with computing entities or communication interfaces of the vehicle 100, mobile computing entities 105, and/or the like.

Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the mapping/routing computing entity 110 may be configured to communicate via wireless external communication networks using any of a variety of protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol. Although not shown, the mapping/routing computing entity 110 may include or be in communication with one or more input elements, such as a keyboard input, a mouse input, a touch screen/display input, audio input, pointing device input, joystick input, keypad input, and/or the like. The mapping/routing computing entity 110 may also include or be in communication with one or more output elements (not shown), such as audio output, video output, screen/display output, motion output, movement output, and/or the like.

The mapping/routing computing entity 110 may also comprise, be associated with, or be in communication with various other systems, such as a mapping/routing platform, an Address Matching System (AMS), a Package Center Information System (PCIS), a Customized Pickup and Delivery System (CPAD), a dispatch management system (DMS), preload assist system (PAS), Customer Action and Response System (CAReS), dispatch planning system (DPS), and a variety of other systems and their corresponding components all referred to herein individually and/or collectively as the mapping/routing computing entity 110. Thus, as will be appreciated, one or more of the mapping/routing computing entity's 110 components may be located remotely from other mapping/routing computing entity 110 components, such as in a distributed system. Furthermore, one or more of the components may be combined and additional components performing functions described herein may be included in the mapping/routing computing entity 110. Thus, the mapping/routing computing entity 110 can be adapted to accommodate a variety of needs and circumstances.

c. Exemplary Mobile Computing Entity

Figure 4:
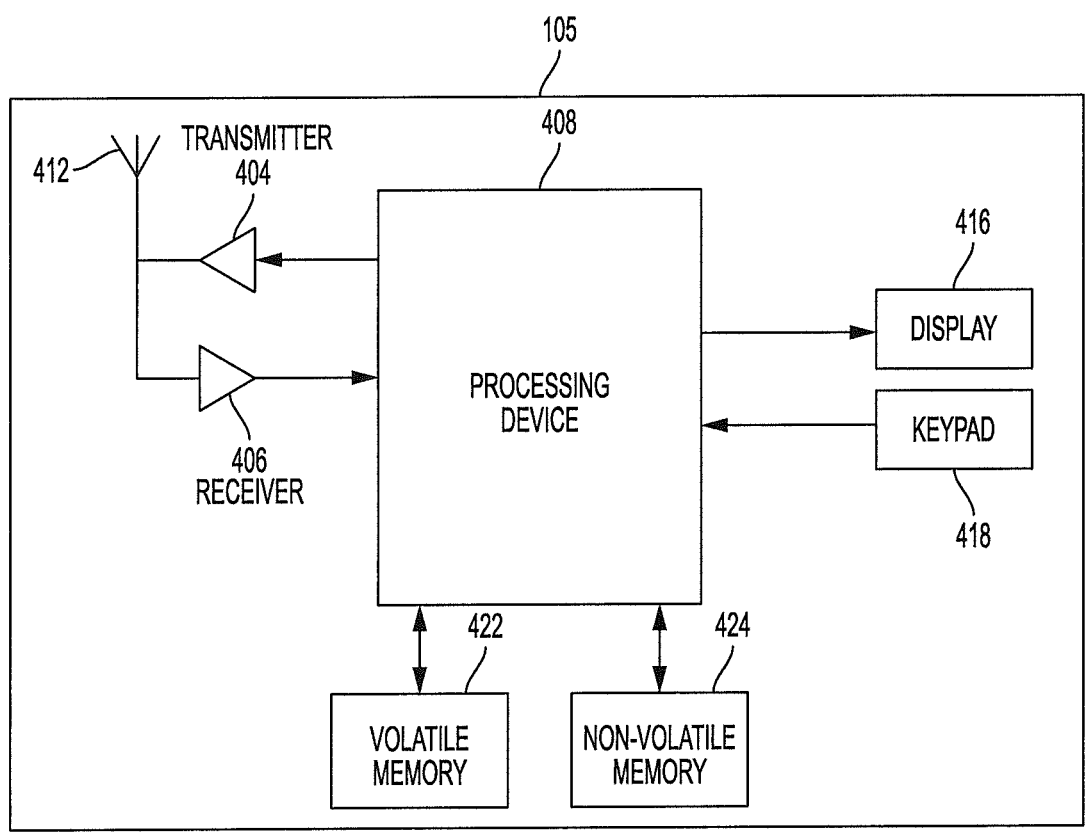
FIG. 4 is a schematic of a mobile computing entity in accordance with certain embodiments of the present invention.

FIG. 4 provides an illustrative schematic representative of a mobile computing entity 105 that can be used in conjunction with embodiments of the present invention. In one embodiment, the mobile computing entities 105 may include one or more components that are functionally similar to those of the mapping/routing computing entity 110 and/or as described below. As will be recognized, mobile computing entities 105 can be operated by various parties, including operators of vehicles 100. As shown in FIG. 4, a mobile computing entity 105 can include an antenna 412, a transmitter 404 (e.g., radio), a receiver 406 (e.g., radio), and a processing element 408 that provides signals to and receives signals from the transmitter 404 and receiver 406, respectively.

The signals provided to and received from the transmitter 404 and the receiver 406, respectively, may include signaling data in accordance with an air interface standard of applicable wireless systems to communicate with various entities, such as vehicles 100, mapping/routing computing entities 110, and/or the like. In this regard, the mobile computing entity 105 may be capable of operating with one or more air interface standards, communication protocols, modulation types, and access types. More particularly, the mobile computing entity 105 may operate in accordance with any of a number of wireless communication standards and protocols. In a particular embodiment, the mobile computing entity 105 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the mobile computing entity 105 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The mobile computing entity 105 can also download changes, add-ons, and updates, for instance, to its firmware, software (e.g., including executable instructions, applications, program modules), operating system, and mapping/routing platform.

According to one embodiment, the mobile computing entity 105 may include location determining aspects, devices, modules, functionalities, and/or similar words used herein interchangeably (e.g., mobile computing entity information/data also referred to herein as information/data). For example, the mobile computing entity 105 may include outdoor positioning aspects, such as a location module adapted to acquire, for example, latitude, longitude, altitude, geocode, course, direction, heading, speed, UTC, date, and/or various other information/data. In one embodiment, the location module can acquire information/data, sometimes known as ephemeris information/data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined/identified by triangulating the mobile computing entity's 105 position in connection with a variety of other systems, including cellular towers, Wi-Fi access points, and/or the like. Similarly, the mobile computing entity 105 may include indoor positioning aspects, such as a location module adapted to acquire, for example, latitude, longitude, altitude, geocode, course, direction, heading, speed, time, date, and/or various other mobile computing entity information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine/identify the location of someone or something to within inches or centimeters.

The mobile computing entity 105 may also comprise a user interface (that can include a display 416 coupled to a processing element 408) and/or a user input interface (coupled to a processing element 408). For example, the user interface may be an application, browser, user interface, dashboard, webpage, and/or similar words used herein interchangeably executing on and/or accessible via the mobile computing entity 105 to interact with and/or cause display of information. The user input interface can comprise any of a number of devices allowing the mobile computing entity 105 to receive information/data, such as a keypad 418 (hard or soft), a touch display, voice/speech or motion interfaces, scanners, readers, or other input device. In embodiments including a keypad 418, the keypad 418 can include (or cause display of) the conventional numeric (0-9) and related keys (#, *), and other keys used for operating the mobile computing entity 105 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the mobile computing entity can collect contextual information/data as part of the mobile computing entity information/data.

The mobile computing entity 105 can also include volatile storage or memory 422 and/or non-volatile storage or memory 424, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, information/data, applications, programs, program modules, scripts, source code, object code, byte code, compiled code, interpreted code, machine code, executable instructions, and/or the like to implement the functions of the mobile computing entity 105.

d. Exemplary User Computing Entity

In one embodiment, the user computing entities 140 may each include one or more components that are functionally similar to those of the mapping/routing computing entity 110 and/or the mobile computing entity 105. For example, in one embodiment, each of the user computing entities 140 may include: (1) a processing element that communicates with other elements via a system interface or bus; (2) a user interface; (3) transitory and non-transitory memory; and (4) a communications interface. As previously noted, the user computing entity 140 may comprise a user interface. For example, the user interface may be an application, browser, user interface, dashboard, webpage, and/or similar words used herein interchangeably executing on and/or accessible via the user computing entity 140 to interact with and/or cause display of information/data from the mapping/routing computing entity 110 and/or the mobile computing entity 105, as described herein. In certain embodiments, the interface may be a mapping/routing application, mapping/routing browser, mapping/routing interface, mapping/routing dashboard, mapping/routing webpage, and/or similar words. These architectures are provided for exemplary purposes only and are not limiting to the various embodiments.

III. Exemplary System Operation

Figure 5:
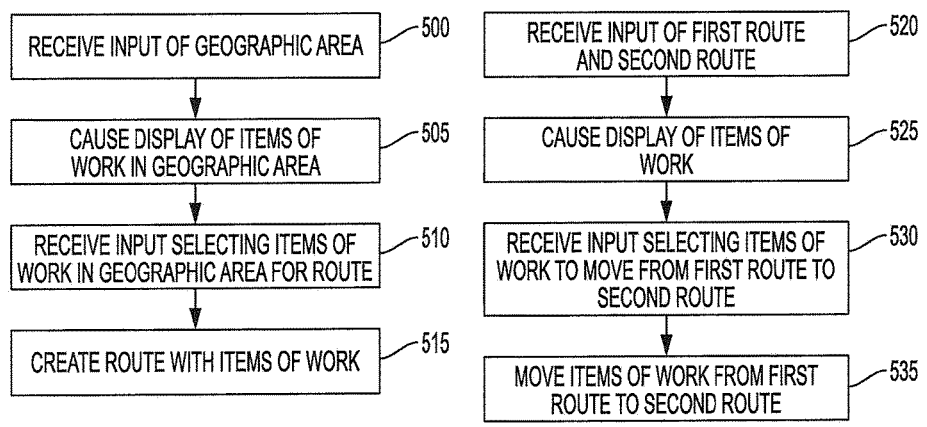
FIG. 5 is a flowchart illustrating operations and processes that can be used in accordance with various embodiments of the present invention.

Reference will now be made to FIGS. 5-13. FIG. 5 is a flowchart illustrating operations and processes that can be used in accordance with various embodiments of the present invention. FIGS. 6-13 illustrate exemplary input and output in accordance with various embodiments of the present invention.

a. Exemplary Map Information

In one embodiment, a "service point" may be any identifiable location, such as one or more addresses, delivery locations, parking locations, sidewalks, highways, trails, alleys, paths, walkways, streets, street segments, entrance or exit ramps, roads, longitude and latitude points, geocodes, zip codes, area codes, territories, cities, counties, states, provinces, countries, stops (e.g., pick up stops, delivery stops, vehicle visits, stops) geofenced areas, geographic areas, landmarks, buildings, bridges, and/or other identifiable locations. For example, a service point may be a residential location, such as one or more homes, one or more mobile homes, one or more apartments, one or more apartment buildings, one or more condominiums, one or more townhomes, one or more points at such locations, and/or the like. The service point may also be any specific location at a residential location, e.g., (e.g., front door of a residence, side door of a residence, and/or the like). A service point may also be a commercial location, such as one or more stores in a mall, one or more office buildings, one or more office parks, one or more offices of an apartment complex, one or more garages, one or more warehouses, one or more restaurants, one or more stores, one or more retail locations, one or more points at such locations, and/or the like. The service point may also be any specific location at a commercial location, e.g., (e.g., front door of a commercial, dock of a commercial location, and/or the like). A service point may be one or more streets, one or more street segments, one or more zones, one or more areas, one or more latitude and/or longitude points (e.g., 33.7869128, −84.3875602), one or more geocodes, and/or the like. A service point may be any identifiable location. As will be recognized, a variety of approaches and techniques can be used to adapt to various needs and circumstances.

In certain embodiments, service points can be represented digitally in geographical maps as map information/data. Map information/data may include boundary, location, and attribute data corresponding to the various service points and/or the like. As will be recognized, the map information/data can be stored using a variety of formats, layers, and/or the like—including shapefiles, ArcMaps, geodatabases, coverages, imagery, rasters, computer-aided drafting (CAD) files, other storage formats, and/or the like. For instance, the mapping/routing computing entity 110 can appropriately store/record map information/data as a part of a digital map, e.g., as part of a feature layer, raster layer, service layer, icons/graphics layer, geoprocessing layer, basemap layer, satellite layer, street network layer, points of interest layer, service point layer, and/or the like. The term digital map is intended to include any map that can electronically display geographic areas. As will be described in greater detail below, the geographical maps and/or map information/data can be used to manage, create, modify, delete, add, and/or the like service points to assigned areas, regions, routes, paths, and/or the like.

As will be recognized, service points can be represented in digital maps as being accessible by one or more street networks or street segments of a street network. A "street network" is collection of street segments that comprise navigable, traversable, travelable, and/or similar words used herein interchangeably roads, streets, highways, paths, trails, walkways, entrance and exit ramps, bridges, sidewalks, alleys, and/or the like that can be used to access service points. Similarly, service points, street networks, and/or the like can be represented in digital maps as navigable/traversable/travelable segments or points for traveling to and/or from service points.

In one embodiment, the mapping/routing computing entity 110 can store information/data associated with each service point in an object or other data structure. The object or data structure may comprise a variety of information/data associated with each service point, such as a consignee name, pickup or delivery identifier, street name, street number, street prefix, street suffix, street type, city, state, province, territory, country, postal code, residential or commercial indicator, street classification, directionals (e.g., one way <specific to which way> or both ways), longitude and latitude, geocode, location identifier, and/or the like. Similarly, the mapping/routing computing entity 110 can store information/data associated with each street segment of the street network in an object or other data structure. The object or data structure may comprise a variety of information/data associated with each street segment, such as a street segment identifier, street name, street number range, street prefix, street suffix, street type, city, state, province, territory, country, postal code, street classification, directionals (e.g., one way <specific to which way> or both ways), longitude and latitude points defining the street segment, speed limits of one or more portions of the street segment, and/or the like. For example, in one embodiment, a service point may be represented by and/or associated with a longitude and latitude, a geocode, a nearest street segment, an address, and/or the like. Similarly, street segments of street networks may be represented by or associated with a street name, a segment identifier, a connecting node, an address or address range, a series of longitude and latitude coordinates, and/or the like that define the overall shape and location of the street segment. As will be recognized, a variety of other approaches and techniques can be used to adapt to various needs and circumstances.

In one embodiment, the mapping/routing computing entity 110 may store digital maps. In another embodiment, the mapping/routing computing may be in communication with or associated with one or more mapping websites/servers/providers/databases (including providers such as maps.google.com, bing.com/maps/, mapquest.com, Tele Atlas®, NAVTEQ®, and/or the like) that provide map information/data of digital maps to a variety of users and/or entities. Using the digital maps, an appropriate computing entity can provide map information/data, for example, about service points (e.g., their locations, attributes, and/or the like) and/or their corresponding street networks based on map information/data. An appropriate computing entity can also provide map information/data, for example, about the geographic areas, regions, groupings, routes, paths, regions, and/or similar words used herein interchangeably about the different service points on the street networks. For instance, the map information/data may include a route for delivering one or more items to different service points, the most efficient order for delivering items to the service points, directions for traveling to and/or from the service points, the estimated distance for traveling to and/or from the service points, the expected time for traveling to and/or from the service points, and/or the like. The map information/data may also include other information/data about service points and/or traveling to and from service points, such as current estimated speeds for associated street segments, historical speeds for associated street segments, nearest street segments, posted speed limits for associated street segments, interpolated locations of service points, reverse geocoded locations of service points, latitude and longitude points of service points, distances between various service points, directions, stop orders, and/or the like. Certain examples of these types of information/data are described in U.S. Publ. No. 2013-0304349, which is hereby incorporated in its entirety by reference.

In one embodiment, although not necessary, the map information/data, service point information/data, route information/data, and/or the like can be provided to the driver of the vehicle 100 in a variety of ways and using various formats. For instance, the mobile computing entity 105 (or other appropriate device) may provide turn-by-turn navigation to the driver of a vehicle 100 for traveling between each stop (e.g., a pickup, delivery, or visit at a service point). As will be recognized, a variety of other techniques and approaches can be used to adapt to various needs and circumstances.

In one embodiment, the mapping/routing computing entity 110 can identify, retrieve, determine, and/or similar words used herein interchangeably map information/data associated with the service points, street networks, routes, paths, and/or the like. For example, the mapping/routing computing entity 110 can identify the service points by address, address portions (e.g., street number, street name, type, and/or the like), latitude and longitude points, routes, paths, geographic areas, service point IDs, and/or the like. Table 1 below shows a textual view of eighteen service points each associated with a route, a stop, an address, a city, a state, a longitude and latitude, and/or the like.

TABLE 1

| Route: Stop | Address | City | State |
|---|---|---|---|
| R1: 1 | 1 STREET ADDRESS | ANYTOWN | GEORGIA |
| R1: 2 | 2 STREET ADDRESS | ANYTOWN | GEORGIA |
| R1: 3 | 3 STREET ADDRESS | ANYTOWN | GEORGIA |
| R1: 4 | 4 STREET ADDRESS | ANYTOWN | GEORGIA |
| R1: 5 | 5 STREET ADDRESS | ANYTOWN | GEORGIA |
| R1: 6 | 6 STREET ADDRESS | ANYTOWN | GEORGIA |
| R2: 1 | 7 STREET ADDRESS | ANYTOWN | GEORGIA |
| R2: 2 | 8 STREET ADDRESS | ANYTOWN | GEORGIA |
| R2: 3 | 9 STREET ADDRESS | ANYTOWN | GEORGIA |
| R2: 4 | 10 STREET ADDRESS | ANYTOWN | GEORGIA |
| R2: 5 | 11 STREET ADDRESS | ANYTOWN | GEORGIA |
| R2: 6 | 12 STREET ADDRESS | ANYTOWN | GEORGIA |
| R3: 1 | 13 STREET ADDRESS | ANYTOWN | GEORGIA |
| R3: 2 | 14 STREET ADDRESS | ANYTOWN | GEORGIA |
| R3: 3 | 15 STREET ADDRESS | ANYTOWN | GEORGIA |
| R3: 4 | 16 STREET ADDRESS | ANYTOWN | GEORGIA |
| R3: 5 | 17 STREET ADDRESS | ANYTOWN | GEORGIA |
| R3: 6 | 18 STREET ADDRESS | ANYTOWN | GEORGIA |

The mapping/routing computing entity 110 can also identify the interpolated or reverse geocoded locations (e.g., service points) on the street networks for one or more of the service points, for instance. And, the mapping/routing computing entity 110 can reverse geocode the latitude and longitude points of the service points if available, such as the location of 1 Street Address, Anytown, GA being located at 33.7869128, −84.3875602. As will be recognized, a variety of other techniques and approaches can be used to adapt to various needs and circumstances.

The information/data about service points, routes, paths, regions, geographic areas, street networks, street segments, directions, altitudes, longitudes, latitudes, speed limits, direction restrictions, and/or the like can be collected in a variety of ways.

b. Information/Data

In one embodiment, collected information/data associated with service points, routes, paths, regions, geographic areas, street networks, street segments, and/or the like can be collected/captured. To do so, appropriate computing entities (e.g., data collection devices 130, mobile computing entities 105, and/or other computing entities) can be configured to collect/capture and store various types of information/data as vehicles 100 travel, traverse, or similar words used herein interchangeably street networks (or other areas) and/or as drivers operate the vehicles 100 and/or mobile computing entities 105. In one embodiment, the information/data may comprise telematics information/data, location information/data, and/or mobile computing entity information/data—such as longitude information/data, latitude information/data, altitude information/data, heading or direction information/data, geocode information/data, course information/data, position information/data, time information/data, as well as other types of data (including those previously described).

1. Geofence Based: Defined Geographic Areas

In one embodiment, the process may be begin with a computing entity (e.g., via a user operating the computing entity) identifying or defining one or more geographic areas. In one embodiment, the geographic areas may correspond to one or more addresses, delivery locations, parking locations, sidewalks, highways, trails, alleys, paths, walkways, streets, street segments, entrance or exit ramps, roads, longitude and latitude points, geocodes, zip codes, area codes, territories, cities, counties, states, provinces, countries, stops (e.g., pick up stops, delivery stops, vehicle visits, stops) geofenced areas, geographic areas, landmarks, buildings, bridges, and/or other identifiable locations. For example, geographic areas may be defined around the United States, the state of Georgia, Gwinnett County in the state of Georgia, zip codes, area codes, territories, and/or the like. In one embodiment, the geographic areas may correspond to roads, streets, avenues, toll roads, ways, interstates, and/or the like. For example, each geographic area may be defined around a public road (e.g., substantially around I-285) or a portion of a public road (e.g., exit and/or entrance ramps on I-75 in Georgia or throughout the U.S.). In one embodiment, the geographic areas may correspond to delivery routes, bus routes, and/or taxis routes (e.g., driven by delivery drivers, bus drivers, and/or taxis drivers). The geographic areas may be defined based on zoning classifications associated with different geographic areas (e.g., an office park, industrial park, and/or neighborhood).

According to various embodiments of the present invention, a geographic area may overlap or reside wholly within another geographic area. Geographic areas may, for example, be as large as an entire country, region, state, county, city, or town (or larger). According to various embodiments, the geographic areas need not be continuous. In other words, a geographic area may specifically exclude an area that would otherwise fall within the geographic area (e.g., such that the geographic area forms a donut or other shape around the excluded area).

The geographic areas may be defined based on any number and/or combination of factors including, but not limited to, those described above. The foregoing examples are therefore provided for exemplary purposes only and should not be taken in any way as limiting embodiments of the present invention to the examples provided.

2. Geofence Based: Defined Geofences

In one embodiment, once the geographic areas have been defined or identified, a computing entity (e.g., via the user operating a computing entity) may define one or more geofences, such as defining a geofence around a geographic area. The geofences may be defined to surround a defined geographic area, such as surrounding countries, regions, states, counties, cities, towns, interstates, roads, streets, avenues, toll roads, zip codes, area codes, territories, ways, exit and entrance ramps, delivery routes, bus routes, taxis routes, industrial parks, neighborhoods, off-road areas (e.g., areas without paved roads), private land areas, parking lots (e.g., at malls or other establishments), driveways, and/or the like. The geofences may be defined, for example, by the latitude and longitude coordinates associated with various points along the perimeter of the geographic area. Alternatively, geofences may be defined based on latitude and longitude coordinates of the center, as well as the radius, of the geographic area. Geofences may be as large as an entire country, region, state, county, city, or town (or larger). The geographic areas, and therefore the geofences, may be any shape including, but not limited to, a circle, square, rectangle, an irregular shape, and/or the like. Moreover, the geofenced areas need not be the same shape or size. Accordingly, any combination of shapes and sizes may be used in accordance with embodiments of the present invention. Similarly, a geofence may overlap or reside wholly within another geofence.

Similarly, a geofence may overlap or reside wholly within another geofence. For example, a geofence of a delivery area or town, for instance, may have geofences defined around private land areas (e.g., parking lots of malls), off-road areas, and/or toll roads. In one embodiment, such an embodiment may enable vehicle owners and/or operators to track their toll road use, public road use, non-public road use, and/or the like within a given a.

In one embodiment, once at least one geofence has been defined, the coordinates (or similar methods for defining the geofenced areas) may be stored in an information/database associated with, for example, the data collection device 130, mobile computing entity 105, and/or mapping/routing computing entity 110. Thus, as the vehicle 100 enters and exits the one or more defined geofences, a computing entity (the data collection device 130, mobile computing entity 105, and/or mapping/routing computing entity 110) can monitor the location of the vehicle 100 and trigger/initiate certain events based on the vehicle's 100 location.

3. Geofence Based: Collection of Information/Data

In one embodiment, after the one or more geofenced areas (e.g., geofences) have been defined, the location of the vehicle 100 can be monitored. Generally, the location of the vehicle 100 can be monitored by any of a variety of computing entities, including the data collection device 130, the mobile computing entity 105, the mapping/routing computing entity 110, and/or the like. For example, as noted above, the vehicle's 100 location at a particular time may be determined/identified with the aid of location-determining devices, location sensors 120 (e.g., GNSS sensors), and/or other telemetry location services (e.g., cellular assisted GPS or real time location system or server technology using received signal strength indicators from a Wi-Fi network). By using the vehicle's 100 location, a computing entity (data collection device 130, mobile computing entity 105, mapping/routing computing entity 110, and/or the like) can determine, for example, when the vehicle 100 enters a defined geofence.

In one embodiment, in response to (e.g., after) a determination that a vehicle 100 has entered a defined geofenced area, a computing entity (e.g., the data collection device 130, mobile computing entity 105, or mapping/routing computing entity 110) can collect/capture relevant information/data. For example, the data collection device 130, mobile computing entity 105, or any other appropriate computing entity can collect/capture information/data (e.g., latitude, longitude, direction, altitude, geocode, course, position, time, and/or speed information/data) about the area being traversed while within the geofenced area. Similarly, the data collection device 130, mobile computing entity 105, or any other appropriate computing entity can collect/capture information/data about where a delivery, pickup, or vehicle visit is made within the geofenced area. As will be recognized, a variety of other information/data can also be collected/captured such as speed information/data, geofenced area information/data (e.g., the triggering geofence), emissions information/data, engine information/data, tire pressure information/data, oil pressure information/data, idle information/data, meteorological information/data, and/or the like. In one embodiment, the collected information/data can be routinely, periodically, and/or continuously transmitted to, for example, the mapping/routing computing entity 110.

In one embodiment, after the vehicle 100 has entered the geofenced area, the location of the vehicle 100 can continue to be monitored by any of a variety of computing entities. By using the vehicle's 100 location, a computing entity can determine, for example, when the vehicle 100 exits the defined geofenced area. As described, this may include using location-determining devices, location sensors 120 (e.g., GNSS sensors), or other telemetry location services (e.g., cellular assisted GPS or real time location system or server technology using received signal strength indicators from a Wi-Fi network).

In another embodiment, in response to (e.g., after) a determination that a vehicle 100 has exited the defined geofenced area, a computing entity can collect/capture relevant information/data. For instance, the data collection device 130, mobile computing entity 105, or any other appropriate computing entity can collect/capture information/data (e.g., latitude, longitude, location, direction, altitude, geocode, course, position, time, and/or speed information/data) about the area being traversed outside the geofenced area. Similarly, the data collection device 130, mobile computing entity 105, or any other appropriate computing entity can collect/capture information/data about where a delivery, pickup, or vehicle visit is made outside the geofenced area. As described, a variety of other information/data can also be collected/captured, such as speed information/data, emissions information/data, geofenced area information/data (e.g., the triggering geofence), RPM information/data, tire pressure information/data, oil pressure information/data, idle information/data, meteorological information/data, and/or the like. Moreover, the collected information/data can be routinely, periodically, and/or continuously transmitted to, for example, the mapping/routing computing entity 110.

As indicated, collected/captured information/data can be stored/recorded in an electronic record. For example, in one embodiment, a computing entity (e.g., the data collection device 130, mobile computing entity 105, or mapping/routing computing entity 110) can create a record for each service point, for each visit to a service point, each variation of an address or name associated with a service point, for a route, for a trip, for a time period, and/or the like. In these examples, the records can be updated on a routine, periodic, and/or continuous basis. As will be recognized, a variety of other approaches and techniques can be used to adapt to various needs and circumstances.

4. Non-Geofence Based: Collection of Information/Data

In one embodiment, the appropriate computing entities can collect/capture information/data regularly, periodically, continuously, and/or upon determining the occurrence of one or more predefined triggers/events. In another embodiment, the appropriate computing entities can collect/capture information/data in response to certain triggers or events. For example, the data collection device 130 can monitor information/data generated by the vehicle sensors (120, 125) for parameters that match predefined triggers/events. In one embodiment, the data collection device 130 can monitor some or all of the following predefined events: (a) the vehicle 100 being turned on and beginning to idle (e.g., where vehicle sensors 120, 125 indicate the vehicle's engine is turned on and the vehicle speed is zero); (b) the vehicle 100 beginning to move and thereby ceasing to idle (e.g., where the vehicle sensors 120, 125 indicate the vehicle's engine is on and the vehicle's speed has increased from zero to a non-zero value); (c) the vehicle 100 slowing to a stop and beginning to idle (e.g., where the vehicle sensors 120, 125 indicate the vehicle's engine is on and the vehicle's speed has decreased from a non-zero value to zero); (d) the vehicle 100 being turned off and ceasing to idle (e.g., where the vehicle sensors 120, 125 indicate the vehicle's engine is turned off and the vehicle speed is zero); (e) the vehicle 100 moving out of a geo-fenced area; (f) the vehicle 100 moving into a geo-fenced area; (g) the vehicle 100 moving into a geo-fenced area associated with a delivery area assigned to or associated with the vehicle 100 and/or its driver; (h) the vehicle 100 moving out of a geo-fenced area associated with a delivery area assigned to or associated with the vehicle 100 and/or its driver; (i) the vehicle 100 beginning to move in a reverse direction; (j) the vehicle 100 ceasing to move in a reverse direction; (k) the vehicle's 100 seat belt being engaged or disengaged while the vehicle's 100 engine is on; (l) the vehicle 100 beginning to move in a forward direction; (m) the vehicle 100 ceasing to move in a forward direction; (n) the vehicle 100 traveling above a certain speed; (o) the vehicle 100 being placed in the park position; and/or a variety of other triggers/events.

The data collection device 130 can determine/identify whether any of such (or other) predefined triggers/events have occurred as the vehicle 100 traverses, travels, visits, or operates on street networks (or other areas) and/or as the driver operates the vehicle 100 and/or mobile computing entity 105. If a predefined trigger/event is detected, the data collection device 130 can capture and store information/data from the vehicle sensors 120, 125. As noted earlier, the information/data captured from the sensors 120, 125 may include various types of information/data, including location information/data.

If a predefined trigger/event is not detected, the data collection device 130 can determine/identify whether a threshold data capture time has elapsed. For example, in one embodiment, the threshold data capture time can be defined as 30 seconds (or any other time period). If the data collection device 130 determines that the threshold data capture time has not elapsed, the data collection device 130 can continue monitoring for predefined events. However, if the data collection device 130 determines that the threshold data capture time has elapsed (e.g., more than 30 seconds have passed since the last time that data was captured from the vehicle sensors), the data collection device 130 can capture information/data.

In one embodiment, the information/data may include contextual information/data collected/captured with the information/data. In another embodiment, contextual information/data can be associated with the collected/captured information/data. For instance, an appropriate computing entity (e.g., mobile computing entity 105) can be configured to collect/capture some or all of the following contextual information/data: (a) the date (e.g., 12/30/2014) and time (e.g., 13:24) the information/data is captured; (b) the driver associated with the mobile computing entity 105 at the time the information/data is captured (e.g., James P. Smith); (c) the vehicle associated with the driver at the time the information/data is captured (e.g., a vehicle identification number such as AS445); (d) the type of information/data captured (e.g., stop status, lunch break); (e) if applicable—a route number and/or stop number associated with the input information/data (e.g., stop 3); (f) the service point associated with the information/data captured; (g) the address associated with the information/data captured; (h) a logged reason for and location of the data capture (e.g., a code indicating the detected predefined trigger/event or indicating that the threshold data capture time interval elapsed); and/or the like. Further, in one embodiment, an appropriate computing entity (e.g., the data collection device 130, the mapping/routing computing entity 110, the mobile computing entity 105, and/or the like) can be configured to associate the captured information/data with the contextual information/data by, for example, storing fields of information/data captured from the vehicle sensors 120, 125 in the same record, or records, as concurrently captured contextual information/data, thereby associating the two types of data if necessary.

In one embodiment, the data collection device 130 can transmit the captured information/data and/or associated contextual information/data to the mapping/routing computing entity 110 or mobile computing entity 105. This may be accomplished by using any of the transmission methods and systems described herein, as well as other methods, protocols, and systems known in the art. In one embodiment, the data collection device 130 can be configured to first attempt to transmit captured data to the mapping/routing computing entity 110, and subsequently attempt to transfer data to the mobile computing entity 105 if a connection with the mapping/routing computing entity 110 is unavailable.

According to various embodiments, the mobile computing entity 105 can also be configured to capture information/data. More specifically, the mobile computing entity 105 can collect/capture information/data regularly, periodically, continuously, and/or upon determining the occurrence of one or more predefined triggers/events. For instance, the mobile computing entity 105 can monitor its user interface or other inputs for user input (e.g., from a driver). In one embodiment, the mobile computing entity 105 can be configured to receive and recognize user input indicating some or all of the following: (a) that a delivery stop has commenced; (b) that a delivery stop has ended; (c) that a particular delivery stop is a pickup, delivery, or both; (d) that a particular bill of lading and its associated freight or packages have been picked up or delivered; (e) the number of units picked up or delivered at a stop; (f) the weight of packages or freight picked up or delivered at a stop; (g) that a lunch or break period has commenced; (h) that a lunch or break period has ended; (i) that a particular delay has been encountered; (j) that a particular delay has ended; (k) that a driver has begun a work day and is on the clock; (l) that a driver has ended a work day and is off the clock; (m) that the vehicle 100 has moved out of a geo-fenced area (e.g., as indicated by a GPS sensor); (n) that the vehicle 100 has moved into a geo-fenced area; (o) that the vehicle 100 has moved into a geo-fenced area associated with a delivery area assigned to or associated with the vehicle 100 and/or its driver; (p) that the vehicle 100 has moved out of a geo-fenced area associated with a delivery area assigned to or associated with the vehicle 100 and/or its driver; (q) that a scan event of an item (e.g., scanning a barcode) has occurred; (r) that an electronic signature capture event has occurred; (s) that the vehicle 100 or driver is at a particular service point; (t) that an item has been picked up from or delivered to a service point; (u) that the vehicle 100 (or driver walking with the mobile computing entity 105) has entered or exited a street network; (v) that the vehicle 100 has been placed in the park position; (w) that a configurable period of time has elapsed; (x) that a vehicle visit to a service point has occurred; and/or the like.

The mobile computing entity 105 can determine/identify whether any of such (or other) predefined triggers/events have occurred. If a predefined trigger/event is detected, the mobile computing entity 105 can collect/capture and store information/data. As noted earlier, the information/data may include various types of information/data, including location information/data. If a predefined trigger/event is not detected, the mobile computing entity 105 can determine/identify whether a threshold data capture time has elapsed. For example, in one embodiment, the threshold data capture time is defined as 30 seconds (or any other predefined time period). If the mobile computing entity 105 determines that the threshold data capture time has not elapsed, the mobile computing entity 105 can continue monitoring for predefined events. However, if the mobile computing entity 105 determines that the threshold data capture time has elapsed (e.g., more than 30 seconds have passed since the last time that data was captured from the vehicle sensors), the mobile computing entity 105 can collect/capture information/data.

In one embodiment, the information/data may include contextual information/data. In another embodiment, the mobile computing entity 105 can collect/capture contextual information/data and associate the contextual information/data with the collected/captured information/data. For instance, the mobile computing entity 105 can be configured to capture some or all of the following contextual information/data: (a) the date (e.g., 12/30/2014) and time (e.g., 13:24) the information/data is captured; (b) the driver associated with the mobile computing entity 105 at the time the information/data is captured (e.g., James P. Smith); (c) the vehicle associated with the driver at the time the information/data is captured (e.g., a vehicle identification number such as AS445); (d) the type of information/data captured (e.g., delay code, stop status); (e) if applicable—a route number and/or stop number associated with the input information/data (e.g., route1, stop 3); (f) the service point associated with the information/data; (g) the address associated with the information/data; and/or the like. Further, the mobile computing entity 105 (or other appropriate computing entity) can be configured to associate the collected/captured information/data with the collected/captured contextual information/data in order to ensure that concurrently captured information/data and contextual information/data are linked. For example, in one embodiment, the mobile computing entity 105 can be configured to store one or more fields of information/data in the same record, or records, as concurrently captured contextual information/data, thereby associating the two types of data if necessary.

In one embodiment, the mobile computing entity 105 can transmit the captured information/data and/or associated contextual information/data to the mapping/routing computing entity 110. This may be accomplished by using any of the transmission methods and systems described herein, as well as other methods, protocols, and systems known in the art. In one embodiment, the mobile computing entity 105 can be configured to first attempt to transmit captured data to the mapping/routing computing entity 110, and subsequently attempt to transfer data to the data collection device 130 if a connection with the mapping/routing computing entity 110 is unavailable.

As previously described, the information/data for a service point can be stored in an object or other data structure for the service points. Similarly, the information/data for a street segment, street network, route, geographic area, region, and/or the like can be stored in various data structures.

c. Mapping/Routing Interface

Figure 6:
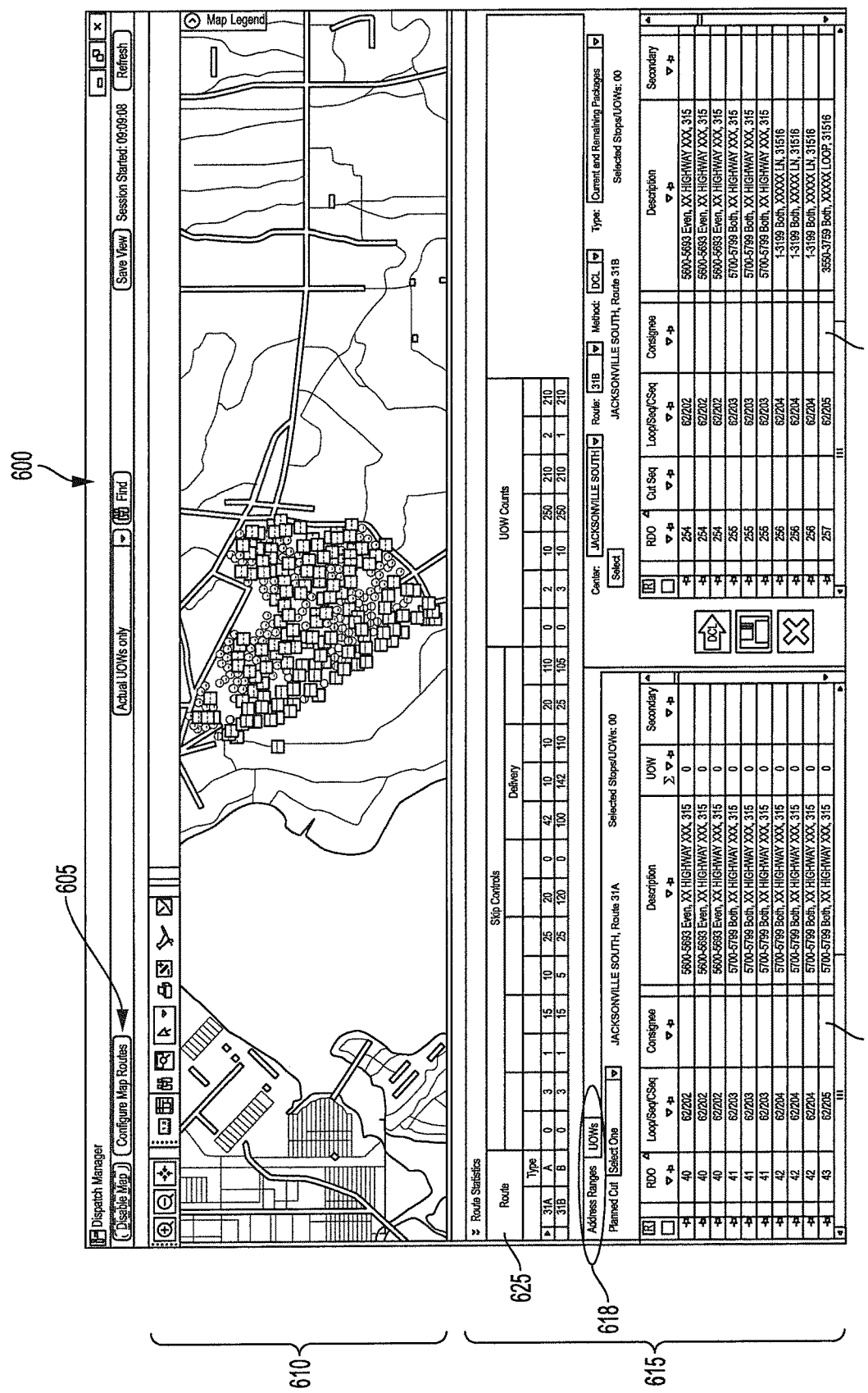
FIGS. 6-13 illustrate exemplary input and output in accordance with various embodiments of the present invention.

In one embodiment, the mapping/routing platform of the mapping/routing computing entity 110 can cause display of information/data and allow users (e.g., operating user computing entities 140) to interact with the same through a mapping/routing application, mapping/routing browser, mapping/routing interface, mapping/routing dashboard, mapping/routing webpage, and/or similar words used herein interchangeably. FIG. 6 shows an exemplary embodiment of a mapping/routing interface 600 displayed via a user computing entity 140. In one embodiment, the mapping/routing interface 600 comprises an information display area/portion 605, a map display area/portion 610, and/or a route display area/portion 615. A display area/portion may be an area or section in an interface, be a separate interface, a popup window, a docked pane, and/or similar words used herein interchangeably. Further, each display area/portion can be positioned, located, displayed, docked, and/or the like in a variety of locations with regard to the other display areas/portions.

1. Information Display Area/Portion

In one embodiment, the information display area/portion 605 comprises an enable/disable toggle graphic, field, icon, image, indicator, control, button, function, and/or similar words used herein interchangeably to allow users (e.g., operating user computing entities 140) to enable or disable the map display area/portion 610 and/or the route display area/portion 615. The information display area/portion 605 may also comprise toggle functions to open or close and/or collapse or expand the map display area/portion 610 and/or the route display area/portion 615. The mapping/routing interface 600 allows users to (a) to select which route (e.g., a source route/region or a destination route) will display as the top-most route (most visible) on the map; (b) to select additional routes (e.g., five additional routes) to display on the map display area/portion 610 at any one time; (c) to remove routes from display on the map display area/portion 610 at any one time; (d) to enable/disable the path from an origin location (e.g., hub, center, warehouse, fulfillment center) to a first stop and from a last stop back; and/or the like.

In one embodiment, the information display area/portion 605 may also comprise a filter toggle graphic, icon, image, indicator, control, button, or function that allows users (e.g., operating user computing entities 140) to limit the types of units of work (UOWs), service points, and/or stops to display through the interface 600. As will be recognized, a UOW may be any task that needs to be performed as part of servicing customers. In the item pickup and delivery context, a UOW may be any task with a time and location that needs to be performed as part of servicing customers, such as a delivery driver follow-up, a concern, a tracer, an on-route pickup, a scheduled pickup, an on demand pickup, a call tag, a paid send again, and/or the like. In one embodiment, each UOW may be represented as a graphic, icon, image, indicator, button, and/or similar words used herein interchangeably in the map display area/portion 610 at the corresponding GPS location, longitude and latitude location, geocode location, and/or the like on the map of the corresponding service point. Further, the icon/graphic of each UOW can be assigned different colors. For example, orange icons/graphics can be used at service point locations for actual and forecasted UOWs; blue icons/graphics can be used at service point locations for actual UOWs only; green icons/graphics can be used for premium UOWs (premium may refer to expedited or enhanced services, such as overnight deliveries); and/or the like. In addition to UOWs, the interface can cause display of information/data associated with elements of work (EOW). EOWs are any tasks that are not directly performed as part of servicing customers. For instance, EOWs may include meal breaks, other work codes, fueling, repairs, and/or the like. In one embodiment, UOWs and EOWs are mutually exclusive. The information display area/portion 605 may also comprise a find graphic, icon, image, indicator, button, or function that allows users to locate addresses in the active map display area/portion 610. As will be recognized, a variety of other approaches and techniques can be used to adapt to various needs and circumstances.

2. Map Display Area/Portion

In one embodiment, the map display area/portion 610 of the mapping/routing interface 600 can display various layers. The layers may include a basemap layer and/or satellite layer. The layers may also include a street network layer on top of the basemap layer and/or satellite layer. The street network layer may include the traversable roads, streets, highways, paths, trails, walkways, entrance and exit ramps, bridges, sidewalks, alleys, and/or the like corresponding to the geographic area of the basemap layer and/or satellite layer that can be used to access service points. A point of interest layer may be used that include carrier centers or hubs, stores, commercial locations, drop-off points, distribution locations, and/or the like. A service point layer may be included that identifies the different service points, forecasted or actual work for the service points, and/or their corresponding attributes. In one embodiment, each layer may be selectable to enable and disable display of the various layers (see FIG. 9).

In one embodiment, the basemap layer and/or satellite layer may comprise a default, such as defaulting to the user's location (e.g., operating a user computing entity 140), the last route or path modified or accessed, the center or hub at which the user works, and/or the like. As one of the map layers, the map display area/portion 610 can cause display of the different service points that are visible in the map display area/portion 610. In one embodiment, each service point or UOW for a service point (e.g., actual or forecasted) may be represented as a graphic, icon, image, indicator, button, and/or similar words used herein interchangeably in the map display area/portion 610 at the corresponding GPS location, longitude and latitude location, geocode location, and/or the like on the map. In one embodiment, services points assigned to or associated with a given route/region may be displayed with a commonly colored graphic. For example, the service points assigned to or associated with a first route/region can be displayed in a first color (e.g., blue), and the services points assigned to or associated with a second route/region can be displayed in a second color (e.g., pink). Similarly, service points not assigned to or associated with a route/region can be displayed using a third color (e.g., a default grey). As will be discussed in greater detail below, one or more services points assigned a first route/region can be reassigned or moved to a second route/region graphically via the map display area/portion 610.

In one embodiment, the map display area/portion 610 can make it easier for users to view and analyze the workload assigned to or associated with specific routes/regions and to determine/identify the best opportunities to move or rebalance the workload, based on proximity to other routes/regions (see FIG. 8)—UOWs for service points (e.g., actual or forecasted). The information/data displayed via the map display area/portion 610 can be controlled by the manager display form 612 shown in FIG. 9 and/or various buttons or controls allowing users to navigate and select items of work within the map display area/portion 610. Although the route display area/portion 615 is not necessarily dependent on and synchronized with/to the map display area/portion 610, it can be dependent and synchronized. Further, the map display area/portion 610 is generally dependent on and synchronized with/to the route display area/portion 615—in addition to being affected by various controls, features, and functions of the information display area/portion 605.

Operatively, when the mapping/routing interface initially opens or displays, it can initialize the map display area/portion 610—requesting display of the basemap layer and the street network layer. The mapping/routing interface can request various map location points and service point addresses (e.g., based on collected information/data) for each address range and UOWs assigned to or associated with the source route. Once the map display area/portion 610 initialization completes, the mapping/routing interface requests the map display area/portion 610 to display the source route's information on the map. In one embodiment, each time users (e.g., operating user computing entities) add, remove, or change the routes to be displayed on the map display area/portion 610, the mapping/routing interface can automatically set the zoom level to fit all of the service point addresses for each route to be displayed on the map.

Whenever the mapping/routing interface is active, users (e.g., operating user computing entities 140) may select a destination route/region using the form's features or functionality. When a route is selected, even if it was previously displayed, the mapping/routing interface requests a fresh set of information/data for the route from the management computing entity 110. The fresh set of information/data includes each address range and UOW assigned to or associated with that route, which is then used to request the map location points for their associated service points (e.g., based on collected information/data). As previously noted, in one embodiment, each route can be displayed using a unique color to easily distinguish the routes. The management computing entity 110 can assign each route's color using the first eight colors, for example, provided by the map display area/portion 610, in the following order: color 1=source route; color 2=destination route; colors 3 thru 8=additional routes 1 through 6. By default, the source route/region can be displayed as the "top-most" route/region. Thus, when the information/data displayed for the source and destination routes/regions overlap, the source route/region can be the most visible. As will be recognized, a variety of other approaches and techniques can be used to adapt to various needs and circumstances.

3. Route Display Area/Portion

Figure 7:
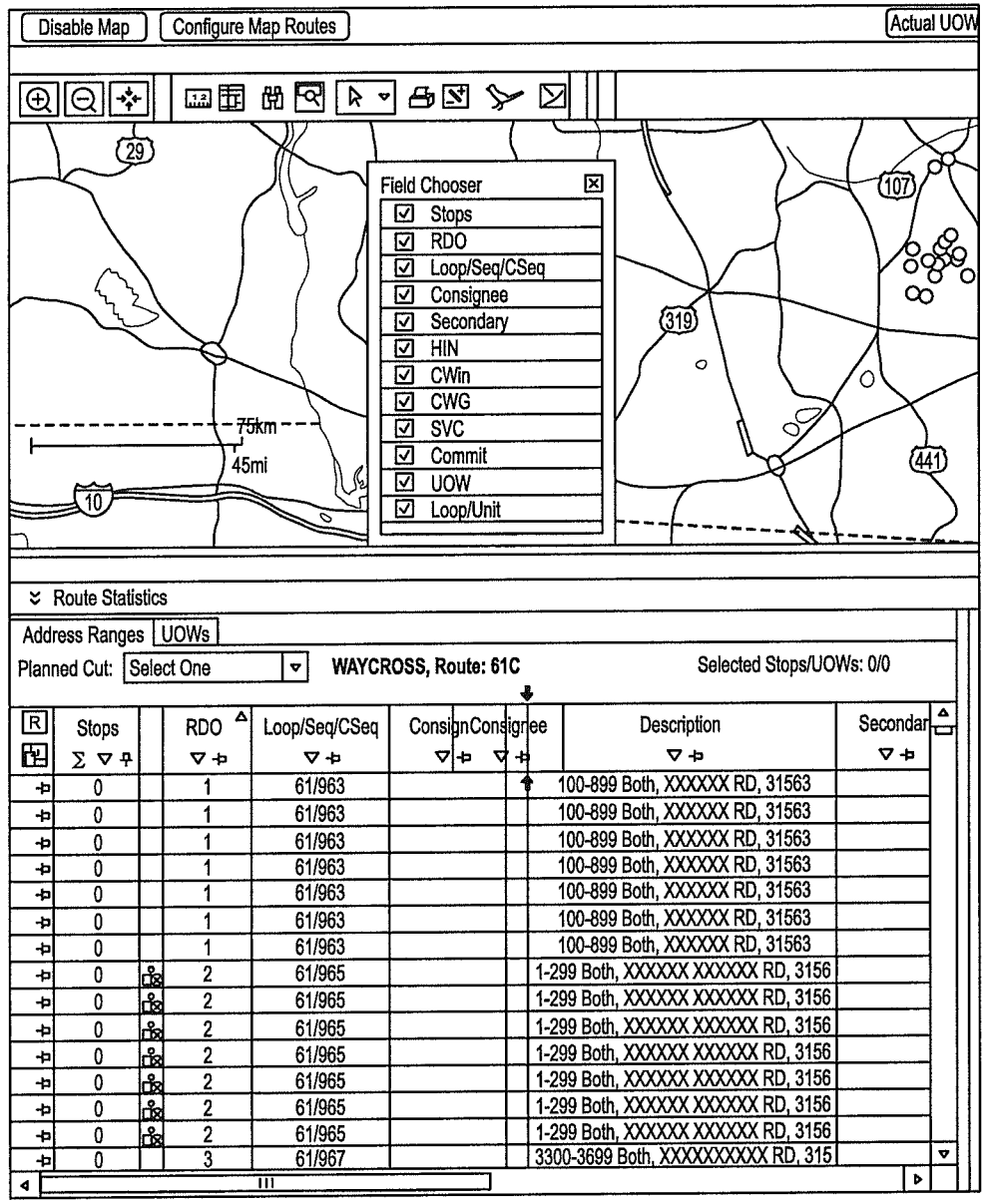
Figure 8:
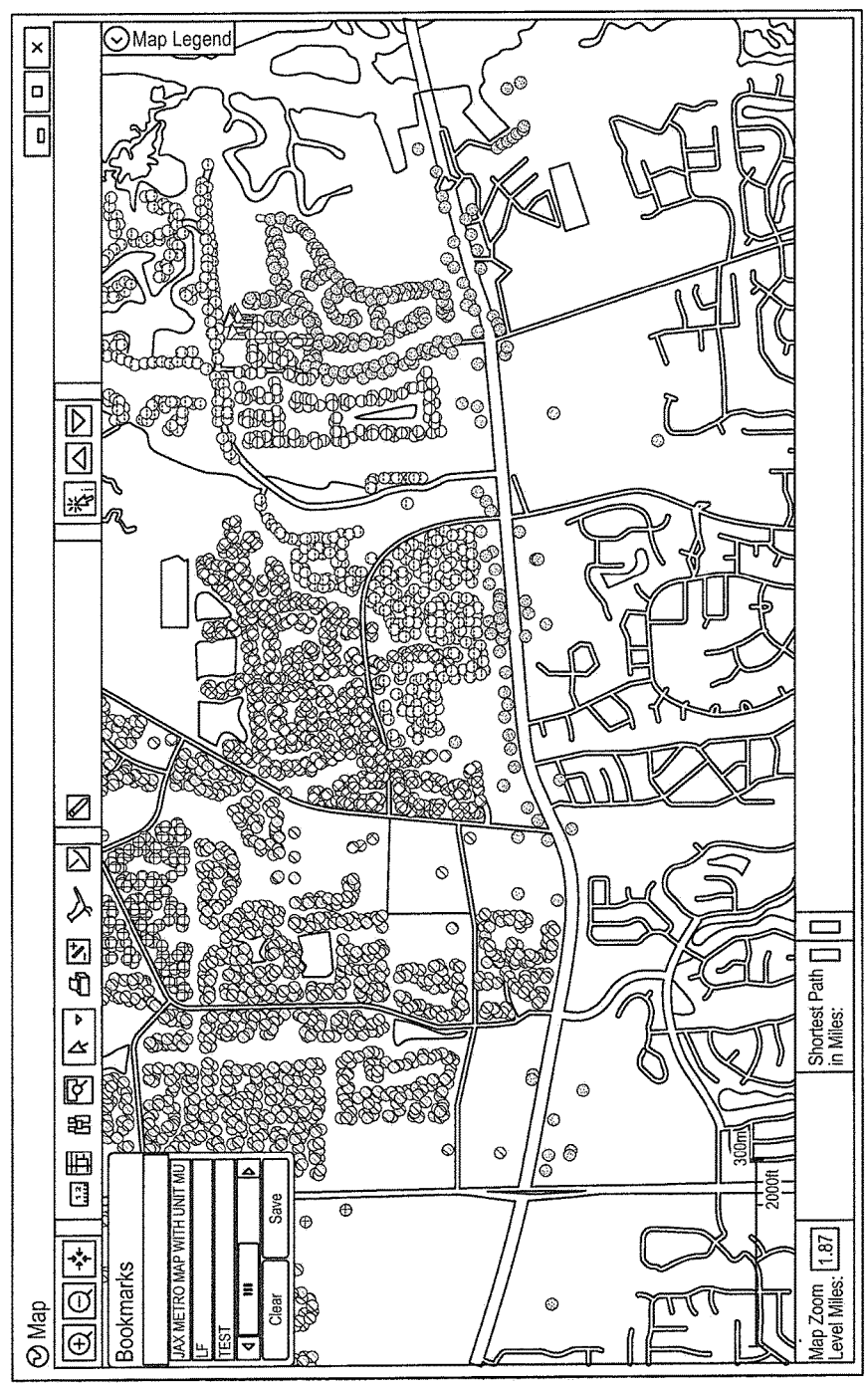
Figure 9:
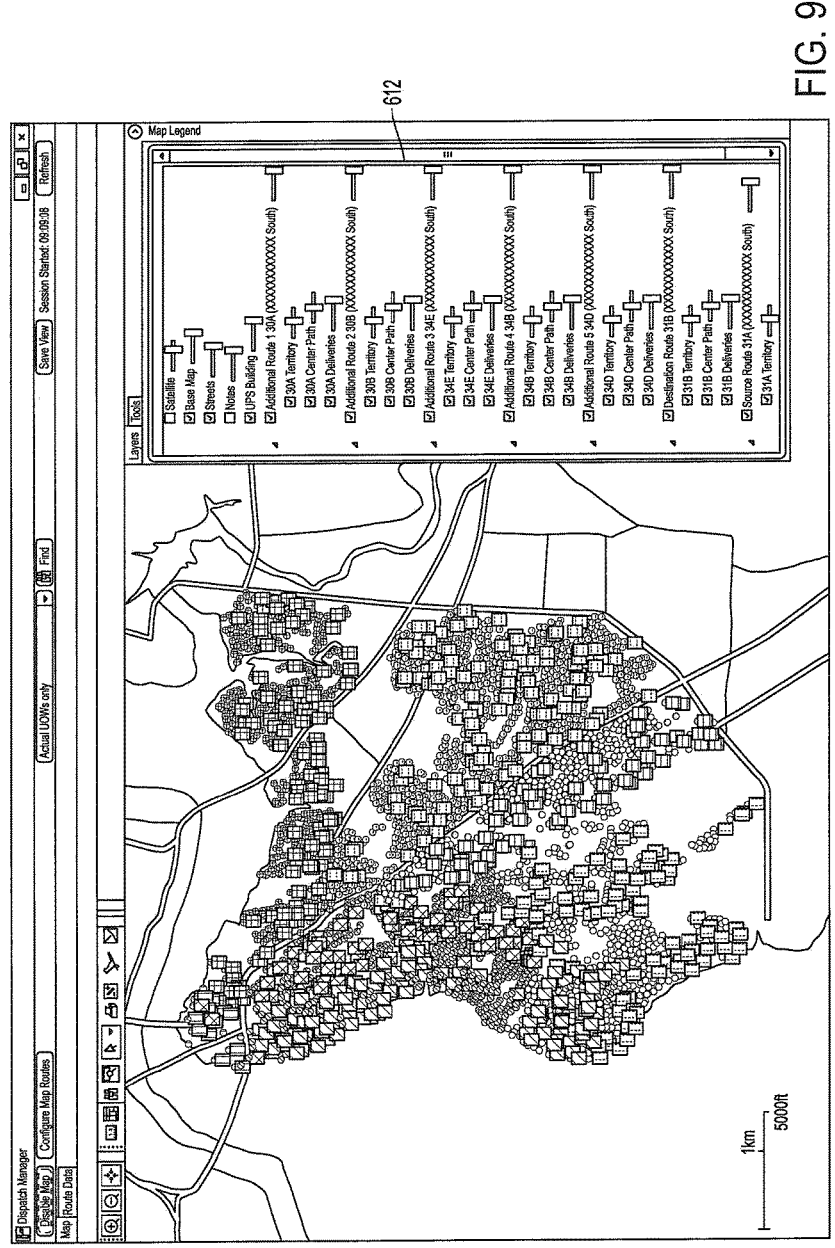

As shown in FIGS. 6 and 7, the route display area/portion 615 of the mapping/routing interface 600 may comprise various tabs, sections, pages, and/or similar words used herein interchangeably. In one embodiment, for a given source route/region (e.g., first route/region), the route display area/portion 615 may comprise one or more tabs 618, such as an address range tab 618, a UOW tab 618, an EOW tab 618, a pickup tab 618, and/or the like. For a source route/region, each corresponding tab 618 may be referred to herein as a source route/region tab 618. In one embodiment, only one source route/region tab 618 is "active" (e.g., "selected") at any given time and may be referred to herein as the active source route/region tab 618. Each source route/region tab 618 can include an independent grid comprising information/data rows, column headings, and customized settings. The corresponding grid for the active source route/region tab 618 is known as the active source route/region grid. If the source route/region tab 618 is "address ranges," the active source route/region grid 620 is "address ranges," "address grid," and/or similar words used herein interchangeably. If the source route/region tab 618 is "UOW," the active source route/region grid 620 is "UOW," "UOW grid," and/or similar words used herein interchangeably. If the source route/region tab 618 is "pickups," the active source route/region grid 620 is "pickups," "pickups grid," and/or similar words used herein interchangeably. And if the source route/region tab 618 is "EOW," the active source route/region grid 620 is "EOW," "EOW grid," and/or similar words used herein interchangeably. In one embodiment, the source route/region is the route/region from which work (e.g., UOW) can be moved.

In one embodiment, similar to a source route/region, for a given destination route/region (e.g., second route/region), the route display area/portion 615 may comprise one or more tabs 618, such as an address range tab 618, a UOW tab 618, an EOW tab 618, a pickup tab 618, and/or the like. For a destination route/region, each corresponding tab 618 may be referred to herein as a destination route/region tab 618. As with the source route/region tab 618, only one destination route/region tab 618 is "active" (e.g., "selected") at any given time and may be referred to herein as the active destination route/region tab 618. Each destination route/region tab 618 can include an independent grid comprising information/data rows; column headings; and customized settings. The corresponding grid for the active destination route/region tab 618 is known as the active destination route/region grid.

If the destination route/region tab 618 is "address ranges," the active destination route/region grid is "address ranges," "address ranges grid," "address grid," and/or similar words used herein interchangeably. In one embodiment, the address ranges grid can initially comprise all of the rows that define a route's address ranges. As described above, the mapping/routing interface can contains two instances of the address ranges grid: source route/region instance and the destination route/region instance. Each instance allows users (e.g., operating computing entities) to select multiple rows simultaneously within its grid. Although the allowable column headings and required information/data formats are similar, each instance's information/data rows and user-configurable grid options may differ.

If the destination route/region tab 618 is "UOW," the active destination route/region grid is "UOW," "UOW grid," and/or similar words used herein interchangeably. In one embodiment, the UOW grid can initially comprise rows for all of the route's UOWs. Similar to the address range grids, the mapping/routing interface contains two instances of the UOW grid: a source route/region instance and a destination route/region instance. Each instance allows users to select multiple rows simultaneously within its grid. Although the allowable column headings and required information/data formats can be similar, each instance's information/data rows and user-configurable grid options may differ.

If the destination route/region tab 618 is "pickups," the active destination route/region grid is "pickups," "pickups grid," and/or similar words used herein interchangeably. In one embodiment, the pickup grid can initially comprise all of the rows which define a route's pickups. The mapping/routing interface can include two instances of the pickups grid: a source route/region instance and a destination route/region instance. Each instance allows users to select multiple rows simultaneously within its grid. Although the allowable column headings and required information/data formats may be similar, each instance's information/data rows and user-configurable grid options may differ.

And if the destination route/region tab 618 is "EOW," the active destination route/region grid is "EOW," "EOW grid," and/or similar words used herein interchangeably. The destination route/region is the route/region to which work (e.g., UOW) can be moved. In one embodiment, the EOW grid can initially comprise all of the rows which define a route's EOWs. The mapping/routing interface can contains two instances of the EOWs grid: a source route/region instance and a destination route/region instance. Each instance allows users to select multiple rows simultaneously within its grid. Although the allowable column headings and required information/data formats may be similar, each instance's information/data rows and user-configurable grid options may differ.

In one embodiment, the grids 620 for displayed routes/regions of the route display area/portion 615 can display information/data associated with the stop, route/region, loop, sequence, name, item of work, and/or address with each service point in a grid format. For example, the left grid 620 may include addresses assigned to or associated with a first route/region (e.g., source route/region), and the right grid 620 may include addresses assigned to or associated with a second route/region (e.g., destination route/region). In one embodiment, the route display area/portion 615 may include a display order functionality that allows users (e.g., operating user computing entities 140) to select and/or create custom views displayed by address range. For example, for each address of a route/region, users (e.g., operating user computing entities 140) can select to display any of the following information/data in the specified order: loop or sequence, name, delivery time, service level, stop, address, unit of work, and/or the like. As will be recognized, a service level may be Next Day Air, Overnight, Express, Next Day Air Early AM, Next Day Air Saver, Jetline, Sprintline, Secureline, 2nd Day Air, Priority, 2nd Day Air Early AM, 3 Day Select, Ground, Standard, First Class, Media Mail, SurePost, Freight, and/or the like.

In one embodiment, the route display area/portion 615 may include a route/region statistics grids 625 with statistical information about routes/regions to help users (a) determine/identify whether they need to perform any add/cut actions to improve the work load balance, (b) monitor the results of their add/cut actions already completed to adjust the work load balance, and/or the like. In one embodiment, the route/region statistics grids 625 can include a row for each route/region being displayed via the map display area/portion 610 and/or the grids 620 of the route display area/portion 615. The route/region statistics grids 625 can include statistics for the corresponding route/region associated with the row. For instance, as shown in FIG. 6, the route/region statistics grid 625 includes a row for the first route/region (e.g., the source route/region) and the second route/region (e.g., the destination route/region). For each row, the displayed information/data contains a "snapshot" of the UOWs (e.g., assigned pickups and deliveries) for the corresponding route/region, service points for the corresponding route/region, minimum or maximum number of set or recommended stops or UOWs for the corresponding route/region, estimated number of stops or UOWs for the corresponding route/region, minimum or maximum number of set or recommended miles to be traveled in servicing the route/region for the corresponding route/region, estimated miles to be traveled in servicing the corresponding route/region, minimum or maximum number of set or recommended time in servicing the route/region for the corresponding route/region, estimated time in servicing the corresponding route/region, route/region identifiers, and/or the like. In certain embodiments, the route/region statistics grid 625 can be updated by the mapping/routing computing entity 110 in response to users actions, such as changing the view options in the mapping/routing interface, selecting the functionality to include all pickups or delivery, selecting a refresh button to request a refreshed information/data "snapshot" from the mapping/routing computing entity 110, selecting a destination route/region that from the source route/region (e.g., requests a "snapshot" from the mapping/routing computing entity 110 and displays the information/data in the destination route's row), recalculating the displayed information/data in response to an add/cut operation, and/or the like. Users can also apply a variety of filters to one or more columns in the displayed rows. For example, if any column filters exist for a grid, only rows matching the criteria for all column filters will be displayed. As will be recognized, a variety of other approaches and techniques can be used to adapt to various needs and circumstances.

In one embodiment, when the mapping/routing interface initially opens or displays, since the source route/region is known, its information/data will be populated in the appropriate areas/portions: route/region statistics; source route/region address ranges grid; source route/region UOW grid; source route/region pickups list grid; source route/region EOW grid; and/or the like. As will be recognized, a variety of other approaches and techniques can be used to adapt to various needs and circumstances.

4. Selecting Items of Work and Synchronization

In one embodiment, at least a portion of the information/data displayed via the map display area/portion 610 can correspond to the information/data displayed via the route display area/portion 615. That is, the map display area/portion 610 is generally dependent on and synchronized with the route display area/portion 615. For instance, the mapping/routing computing entity 110 can cause simultaneous display of related information/data in the map display area/portion 610 (e.g., icons of the service points on the appropriate locations on the map in a layered graphical view) and the route display area/portion 615 (e.g., textual information/data about the addresses) for various services points, UOWs, routes/regions, and/or the like. By way of example, if a UOW or service point has been filtered out from an active grid, its corresponding icon/graphic will no longer be displayed on the map display area/portion 610. Likewise, the map's currently selected elements will be updated to reflect the currently selected rows displayed in the active corresponding grids.

In one embodiment, users (e.g., operating user computing entities 140) can select one or more items of work (e.g., service points, stops, addresses, UOWs, EOWs, pickups, and/or the like) and/or routes/regions in a variety of ways. For instance, users (e.g., operating user computing entities 140) can select one or more items of work (e.g., service points, stops, addresses, UOWs, EOWs, pickups, and/or the like) and/or routes/regions by inputting information/data associated with the service point or UOW, such as entering an address or portion of an address, a route and stop number, a longitude and latitude coordinate, a geocode, a name or part of a customer's name, and/or the like. Similarly, users (e.g., operating user computing entities 140) can select one or more items of work (e.g., service points, stops, addresses, UOWs, EOWs, pickups, and/or the like) by selecting icons/graphics or rows in a grid representing items of work (e.g., service points, stops, addresses, UOWs, EOWs, pickups, and/or the like) and/or routes/regions using keyboard input, mouse input, touch screen/display input, audio input, pointing device input, joystick input, keypad input, and/or the like. In another embodiment, users (e.g., operating user computing entities 140) can select one or more items of work (e.g., service points, stops, addresses, UOWs, EOWs, pickups, and/or the like) and/or routes/regions by creating, drawing, and/or similar words used herein interchangeably polygons around the same in the map display area/portion 610. The polygons can be a variety of shapes and sizes. The input may also include dragging and dropping, cutting and pasting, copying and pasting, and/or the like. Similarly, the items of work can be selected via the route display area/portion 615 by selecting specific rows in a corresponding grid 625, selecting routes/regions via a drop down menu, and/or the like.

In one embodiment, by being synchronized, selecting one or more items of work (e.g., service points, stops, addresses, UOWs, EOWs, pickups, and/or the like) in the map display area/portion 610 can cause the corresponding rows assigned to or associated with those items of work (e.g., service points, stops, addresses, UOWs, EOWs, pickups, and/or the like) to be automatically selected in the appropriate source and/or destination grids of route display area/portion 615. Operationally, when a user (e.g., operating user computing entity 140) selects one or more service points represented in the map display area/portion 610 and the address ranges grid is the active/currently displayed grid for the source route, the mapping/routing computing entity 110 can (a) determine/identify the address range assigned to or associated with that service point or UOW; (b) select the row for that address range in the address ranges grid, provided it has not been filtered out of the corresponding grid; and (c) automatically trigger the mapping/routing computing entity 110 the selection of all of the icons/graphics for the service points on the map assigned to or associated with that selected "address ranges" row. Similarly, when a user (e.g., operating user computing entity 140) selects one or more service points represented in the map display area/portion 610 and the UOW grid is the active/currently displayed grid for the source route, the mapping/routing computing entity 110 can (a) determine/identify the UOWs assigned to or associated with that service point; (b) select the rows for those UOWs UOW grid, provided they have not been filtered out of the corresponding grid; and (c) deliberately does not automatically trigger the selection of anything else on the map. In one embodiment, when items of work are automatically selected in the source or the grids 620 for the corresponding destination routes/regions, if all of the selected rows are not currently visible, the mapping/routing computing entity 110 causes display of as many selected rows as possible inside the viewable scroll region.

In one embodiment, by being synchronized, selecting one or more items of work (e.g., service points, stops, addresses, UOWs, EOWs, pickups, and/or the like) in the route display area/portion 615 can cause the corresponding icons/graphics assigned to or associated with those items of work (e.g., service points, stops, addresses, UOWs, EOWs, pickups, and/or the like) to be automatically selected in the map display area/portion 610. For instance, when users (e.g., operating user computing entities 140) select rows in either the source or destination address range grids, the mapping/routing computing entity 110 can cause all of the icon/graphics corresponding to the service points assigned to or associated with the address ranges in those selected rows (if displayed on the map display area/portion 610) to be automatically be selected on the map display area/portion 610. Similarly, when users (e.g., operating user computing entities 140) select UOW rows in the source UOW grid, the mapping/routing computing entity 110 can cause only the graphics/icons (if displayed on the map) assigned to or associated with those selected UOW rows to be automatically be selected.

As will be recognized, each grid can be independent and have different columns, rows, and selection rules. For instance, when users (e.g., operating user computing entities) select the first two rows in the source address range grid, the appropriate map items of work will be automatically selected as described previously. Then, when users (e.g., operating user computing entities 140) switch to the UOW tab for the first time, there will not be any rows selected in the UOW grid, so there will not be any items of work selected on the map. When users (e.g., operating user computing entities 140) select the fifth UOW listed (the fifth row) in the corresponding grid, then only the service icon/graphic for the fifth UOW will be selected on the map, as described previously. Similarly, when users (e.g., operating user computing entities 140) switch to the address range tab, only the previously selected rows (the first two rows) in the address range grid (and their map items of work) will be selected. Likewise, when users (e.g., operating user computing entities 140) switch again to the "UOW" tab, only the previously selected row (the fifth row) in the UOW grid (and its corresponding icon/graphic on the map) will be selected. In various embodiments, this helps ensure the selected items of work on the map display area/portion 610 and the route display area/portion 615 are kept in synch and the information/data displayed is consistent.

In one embodiment, users (e.g., operating user computing entities 140) can mouse over, hover over, tap, and/or similar words used herein interchangeably different items of work displayed on the map of the map display area/portion 610. Whenever users (e.g., operating user computing entities 140) mouse over a icon/graphic for a service point, the mapping/routing computing entity 110 can trigger various mouse over functionalities, which the mapping/routing computing entity 110 can implement by providing the street number, street name, and postal code of the icon/graphic being moused over to the mapping/routing computing entity 110 to display. Similar functionality can be implemented for users mousing over street segments. As will be recognized a variety of different techniques and approaches can be used to adapt to various needs and circumstances.

d. Creating Routes/Regions

In one embodiment, users (e.g., operating user computing entities 140) can interact with the mapping/routing computing entity 110 through a mapping/routing interface 600 to create one or more routes/regions. To begin, a user (e.g., operating a user computing entity) can select the Create New Route icon. The Create New Route icon can be used to create multiple new routes/regions. After selecting the Create New Route icon, the user (e.g., operating a user computing entity) can then provide input identifying a geographic area in which he or she wants to create one or more routes/regions. For instance, the user (e.g., operating a user computing entity 140) can identify the geographic areas by inputting information/data associated with the geographic areas via the mapping/routing interface 600 (Block 500 of FIG. 5). As previously noted, the geographic areas may correspond to one or more addresses, delivery locations, parking locations, sidewalks, highways, trails, alleys, paths, walkways, streets, street segments, entrance or exit ramps, roads, longitude and latitude points, geocodes, zip codes, area codes, territories, cities, counties, states, provinces, countries, stops (e.g., pick up stops, delivery stops, vehicle visits, stops) geofenced areas, geographic areas, landmarks, buildings, bridges, and/or other identifiable locations. To identify such geographic areas, the user (e.g., operating a user computing entity 140) can enter an address or a portion of an address, a zip code or an area code, a city, a state, a town, a county, a neighborhood, a route/region operator, a longitude and a latitude coordinate, a geocode, a name or part of a customer's name, and/or the like. Similarly, the user (e.g., operating a user computing entity 140) can also select or identify the geographic areas by navigating to the routes/regions using keyboard input, mouse input, touch screen/display input, audio input, pointing device input, joystick input, keypad input, and/or the like. Further, the user (e.g., operating a user computing entity 140) can also select or identify the geographic areas by creating, drawing, and/or similar words used herein interchangeably polygons around the same via the mapping/routing interface 600. The input may also include dragging and dropping, cutting and pasting, copying and pasting, and/or the like. As will be recognized, a variety of different techniques and approaches can be used to adapt to various needs and circumstances.

In one embodiment, after receiving input identifying the appropriate geographic areas, the map display area/portion 610 can cause display of the basemap layer, satellite layer, street network layer, and/or the like associated with the geographic areas. The mapping/routing interface can also request and cause display of the various map location points and service points for the geographic areas in the map display area/portion 610 (e.g., based on collected information/data)—Block 505 of FIG. 5. The mapping/routing interface 600 can also request and cause display of the items of work for the geographic areas in the map display area/portion 610 (Block 505 of FIG. 5). Further, the mapping/routing interface 600 can cause display of the items of work (e.g., service points, stops, addresses, UOWs, EOWs, pickups, and/or the like) for the geographic areas in the route display area/portion 615. As previously noted, the circular icons can represent service points and/or items of work for the geographic areas. In one embodiment, the route display area/portion 615 of the mapping/routing interface 600 can cause simultaneous display of the information/data associated with the items of work in the appropriate areas/portions, tabs, grids, and/or the like.

In one embodiment, to create a route/region for the appropriate geographic areas, a user (e.g., operating a user computing entity 140) can select the service points or items of work that are to be included as part of the route/region (Block 510 of FIG. 5). The service points can be selected as described above, e.g., drawing a polygon around or clicking on the service points in the map display area/portion 610, selecting or highlighting the service points or items of work in the route display area/portion 615, and/or other areas/portions of the mapping/routing interface 600. After selecting the service points and/or items of work that are to be part of the route/region for the appropriate geographic areas, the user (e.g., operating a user computing entity 140) can input the route/region name, a route/region identifier, a minimum or maximum service point or stop count, and/the like. The mapping/routing computing entity 110 can create the route and save/store the route/region along with its corresponding information/data (Block 515 of FIG. 5). As will be recognized, a variety of other approaches and techniques can be used to adapt to various needs and circumstances.

In another embodiment, the mapping/routing platform of the mapping/routing computing entity 110 can create one or more routes/regions for the service points or items of work for the appropriate geographic areas. For example, the mapping/routing platform of the mapping/routing computing entity 110 can automatically create one or more routes/regions for the service points or items of work in the appropriate geographic areas. In doing so, the mapping/routing platform of the mapping/routing computing entity 110 can automatically consider the proximity, service levels, commitment times, and/or the like in creating the routes/regions. After automatically creating the service points and/or items of work that are to be part of a given route/region, the mapping/routing platform of the mapping/routing computing entity 110 can automatically designate a route/region name, a route/region identifier, a minimum or maximum service point or stop count, and/the like for each route/region. The mapping/routing computing entity 110 can then save/store each created route/region along with its corresponding information/data. As will be recognized, a variety of other approaches and techniques can be used to adapt to various needs and circumstances.

e. Modifying Routes/Regions

In one embodiment, users (e.g., operating user computing entities 140) can interact with the mapping/routing computing entity 110 through a mapping/routing interface to modify one or more existing routes/regions manually, semi-automatically, and/or fully automatically. These route/region modifications can occur before or after a route/region has been serviced or during a route/region being serviced. In one embodiment, a user (e.g., operating a user computing entity) can provide input of one or more routes/regions that he or she wishes to modify (e.g., both a source and a destination route/region)—Block 520 of FIG. 5. For instance, the user (e.g., operating a user computing entity 140) can select the routes/regions by inputting information/data associated with the routes/regions via the mapping/routing interface 600, such as entering an address or a portion of an address, a zip code or an area code, a route/region identifier, a route/region operator, a longitude and a latitude coordinate, a geocode, a name or part of a customer's name, and/or the like. Similarly, the user (e.g., operating a user computing entity 140) can select or identify the routes/regions by navigating to the routes/regions using keyboard input, mouse input, touch screen/display input, audio input, pointing device input, joystick input, keypad input, and/or the like. Further, the user (e.g., operating a user computing entity 140) can select or identify the routes/regions by creating, drawing, and/or similar words used herein interchangeably polygons around the same. The input may also include dragging and dropping, cutting and pasting, copying and pasting, and/or the like. In another embodiment, the mapping/routing platform of the mapping/routing computing entity 110 can suggest and/or carry out modifications to one or more routes/regions in a semi-automatic or fully-automatic manner. For instance, assume a new pickup request were to be received at 10:00 am on a Wednesday. In such a case, the mapping/routing platform of the mapping/routing computing entity 110 may suggest/recommend a modification to a route/region that is currently being serviced by a driver to accommodate the new pickup request. Such a modification may require user approval (e.g., via a user operating a user computing entity 140) or be carried out in a fully-automated manner. As will be recognized, a variety of different techniques and approaches can be used to adapt to various needs and circumstances. Thus, it will be understood that any examples described with user input can also implemented in a semi-automatic manner or fully-automatic manner.

In one embodiment, after receiving input identifying the appropriate routes/regions, the map display area/portion 610 can cause display of the basemap layer, satellite layer, street network layer, and/or the like associated with the appropriate routes/regions. The mapping/routing interface can also request and cause display of the various map location points and service points for the routes/regions in the map display area/portion 610 (e.g., based on collected information/data)—Block 525 of FIG. 5. The mapping/routing interface 600 can also request and cause display of the items of work for the routes/regions in the map display area/portion 610, e.g., based on the previously described color scheme (Block 525 of FIG. 5). Further, the mapping/routing interface 600 can cause display of the items of work for the routes/regions in the route display area/portion 615 (Block 525 of FIG. 5). This can allows users (e.g., operating user computing entities 140) to view, navigate, and modify the information/data (e.g., items of work) displayed via the map display area/portion 610, the route display area/portion 615, and/or other areas/portions of the mapping/routing interface 600.

As indicated, after identifying one or more routes/regions to be modified, the mapping/routing interface 600 can cause display of the related items of work (e.g., service points, stops, addresses, UOWs, EOWs, pickups, and/or the like). For example, for UOWs, the forecasted UOWs can be determined based at least in part on historical shipping information/data, trends, and/or the like. Similarly, the actual UOWs can be determined based at least in part on electronic package data (EPD) for items that have been ingested into or are expected to be ingested into the carrier's transportation and logistics network. In particular, the EPD can provide an indication as to which stops (e.g., service points) will have actual deliveries of items on a given day. This information/data can be used to determine/identify, for example, the stops or service points that will have deliveries and/or whether a region is overloaded for a given delivery day.

Figure 10:
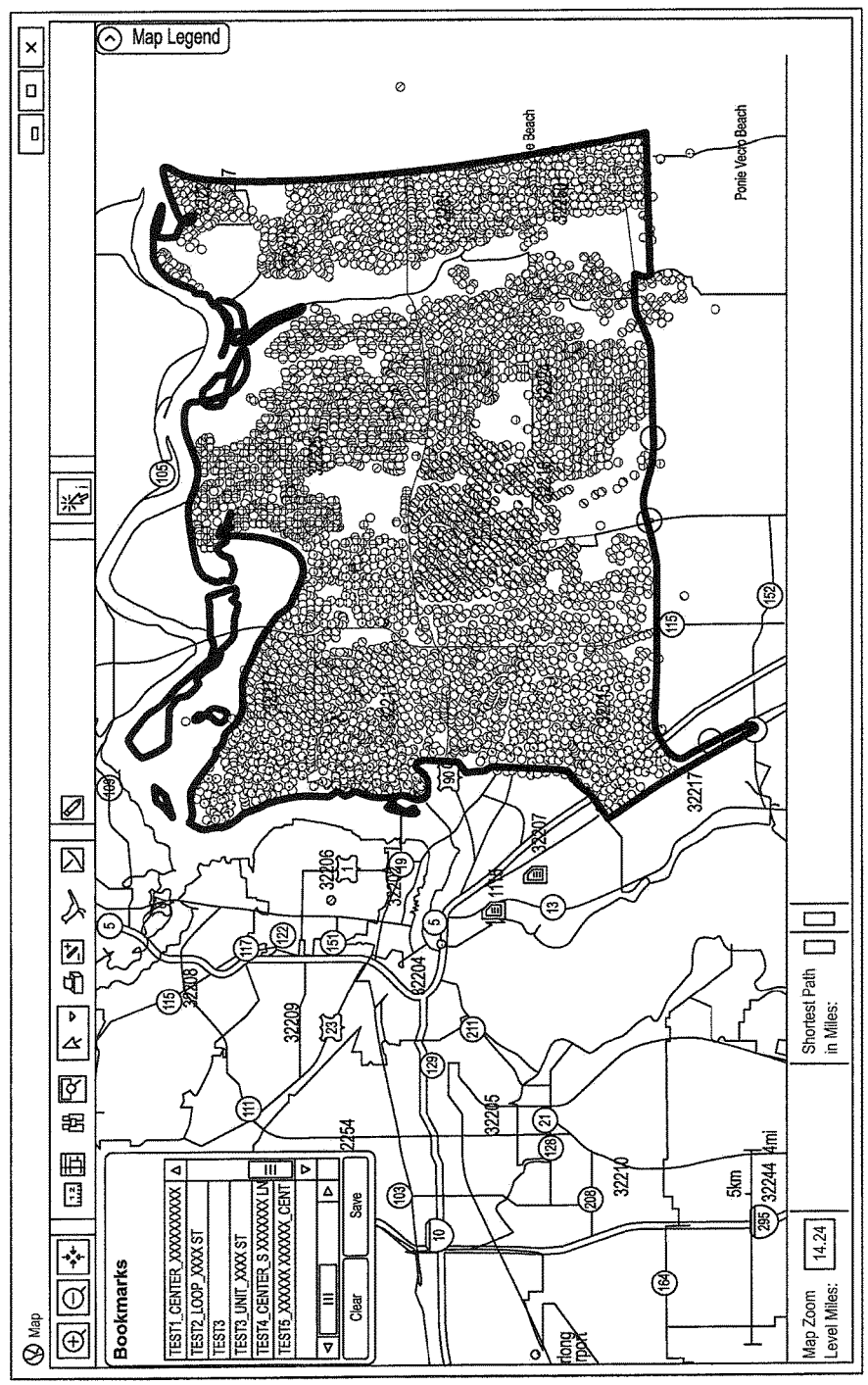

By way of example, FIG. 10 shows polygons drawn around geographic areas. In the geographic areas, there are 12 different regions/routes within the polygon with each route/region being displayed by the map display area/portion 610 of the mapping/routing interface 600. In this example, the circular icons associated with each route/region can represent service points assigned to or associated with the route/region or actual or expected UOWs at the service points assigned to or associated with the route/region. For instance, the colors of the routes/regions may be royal blue, yellow, magenta, teal, red, bright green, purple, beige, light blue, brown, light green, and light brown. These colors are used to distinguish between the various service points and/or UOWs (and/or other items of work) assigned to or associated with the various routes/regions. In one embodiment, the route display area/portion 615 of the mapping/routing interface 600 can cause simultaneous display of the information/data associated with the items of work in the appropriate areas/portions, tabs, grids, and/or the like. Similarly, the route/region statistics grid 625 can cause simultaneous display of statistics for each route/region in the polygon—such as including a row with various statistics for each route/region being displayed via the map display area/portion 610.

1. Modifying (Add/Cut) Different Routes/Regions

In one embodiment, planned adds/cuts and/or unplanned adds/cuts can be carried out through the mapping/routing interface 600 (Blocks 530 and 535) manually, semi-automatically, and/or fully automatically. A planned add or addition of an item of work is an item of work that may be added to a route/region if, for example, the particular route/region has a stop count that is less than the planned stop count for that day. Similarly, a planned cut of an item of work is an item of work that may be removed from a route/region if, for instance, the particular route/region exceeds its planned stop count for that day. Other reasons for adding/moving or cutting/moving planned items of work may be for a route/region being under or above the set or recommended miles to be traveled in servicing the route/region, the set or recommended time for servicing the route/region, and/or the like. Unplanned adds/cuts are adds/cuts for which there are no minimum, maximum, or recommended items of work parameters that are exceeded or not met. As will be recognized, a variety of other approaches and techniques can be used to adapt to various needs and circumstances.

In one embodiment, the mapping/routing interface 600 can be used to modify existing routes/regions. Modifying existing routes/regions may include removing/moving one or more items of work from a route/region, adding/moving one or more items of work from a route/region, reordering items of work on a route/region, and/or the like. To do so, a user (e.g., operating a user computing entity 140) can select the desired source and destination routes/regions by, for example, double clicking, tapping, selecting from a drop down menu, and/or otherwise inputting or selecting the desired source and destination routes/regions in the map display area/portion 610 and/or the route display area/portion 615 of the mapping interface 600. As will be recognized, the source route/region is the route/region from which the items of work items of work (e.g., service points, stops, addresses, UOWs, EOWs, pickups, and/or the like) will be moved/cut, and the destination route/region is the route/region to which the items of work will be moved/added. In certain circumstances, the source route/region and the destination route/region can be the same.

In one embodiment, by selecting the source route/region, the mapping/routing interface 600 causes the source route's information/data to be added to the route/region statistics grid 625, the grid 620 for the corresponding destination route/region, and/or the map display area/portion 610 depending on how the source route/region was selected. For example, the grid 620 for the corresponding routes/regions can include the address ranges, UOWs, pickups, and EOWs defined by the mapping/routing platform and/or moved/added in a previous add/cut session. In one embodiment, the rows (e.g., items of work) added in a previous add/cut session may be displayed in the grid 620 with a single asterisk ("*") in the description column and/or some other indicator. Similarly, by selecting the destination route/region, the mapping/routing interface 600 causes the destination route's information/data to be added to the route/region statistics grid 625, and/or the grid 620 for the corresponding destination route/region.

Figure 11:
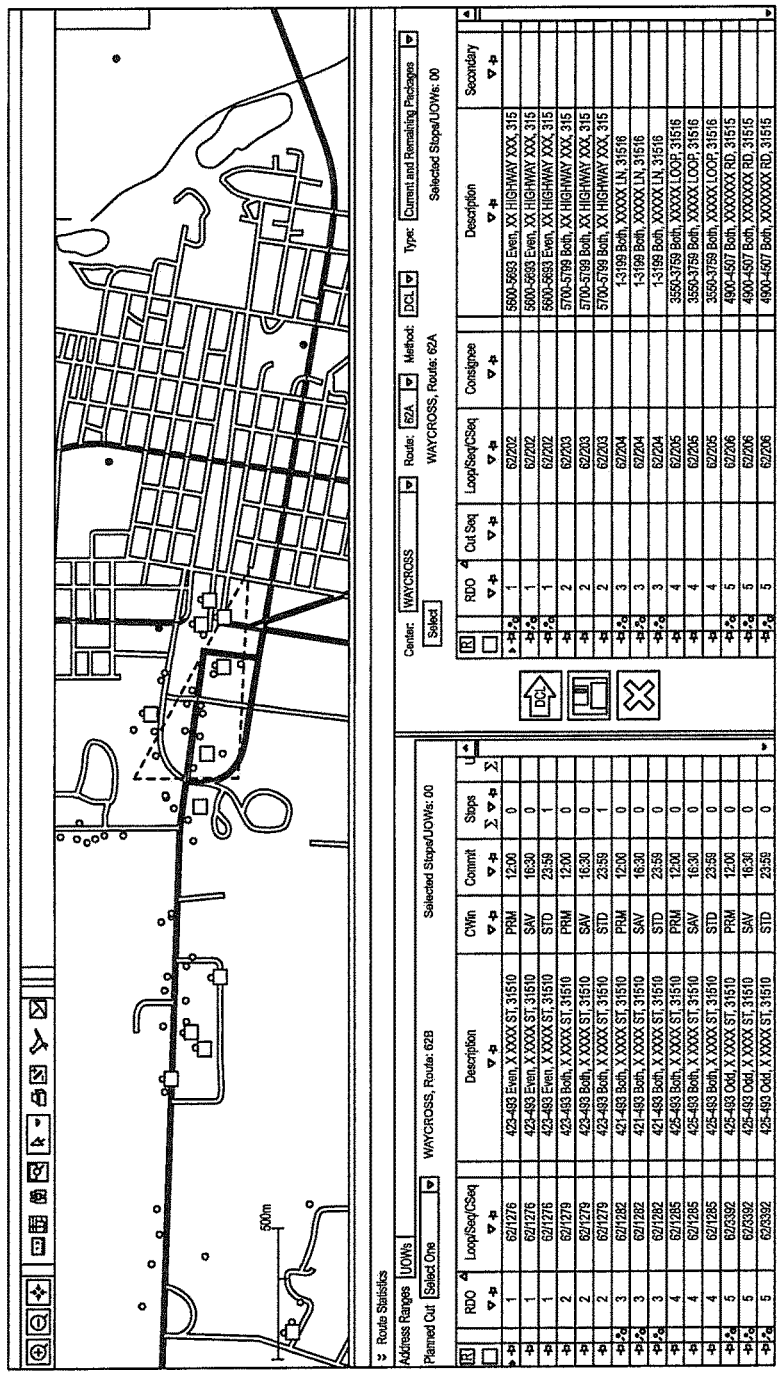

Once the source and destination routes/regions are selected, a user (e.g., operating a user computing entity 140) can select the items of work (e.g., through the map display area/portion 610 and/or the route display area/portion 615) that he or she plans to move/cut from the source route/region and move/add to the destination route/region. The one or more items of work (e.g., service points, stops, addresses, UOWs, EOWs, pickups, and/or the like) can be selected by (a) entering an address or portion of an address, a route and stop number, a longitude and latitude coordinate, a geocode, a name or part of a customer's name, and/or the like; (b) selecting items of work by selecting icons/graphics or rows in a grid representing items of work using keyboard input, mouse input, touch screen/display input, audio input, pointing device input, joystick input, keypad input, and/or the like; and/or (c) selecting items of work by creating, drawing, and/or similar words used herein interchangeably polygons around the same in the map display area/portion 610. For example, FIG. 11 shows a user (e.g., operating a user computing entity 140) selecting items of work by drawing a polygon around the items of work in the map display area/portion 610.

Figure 12:
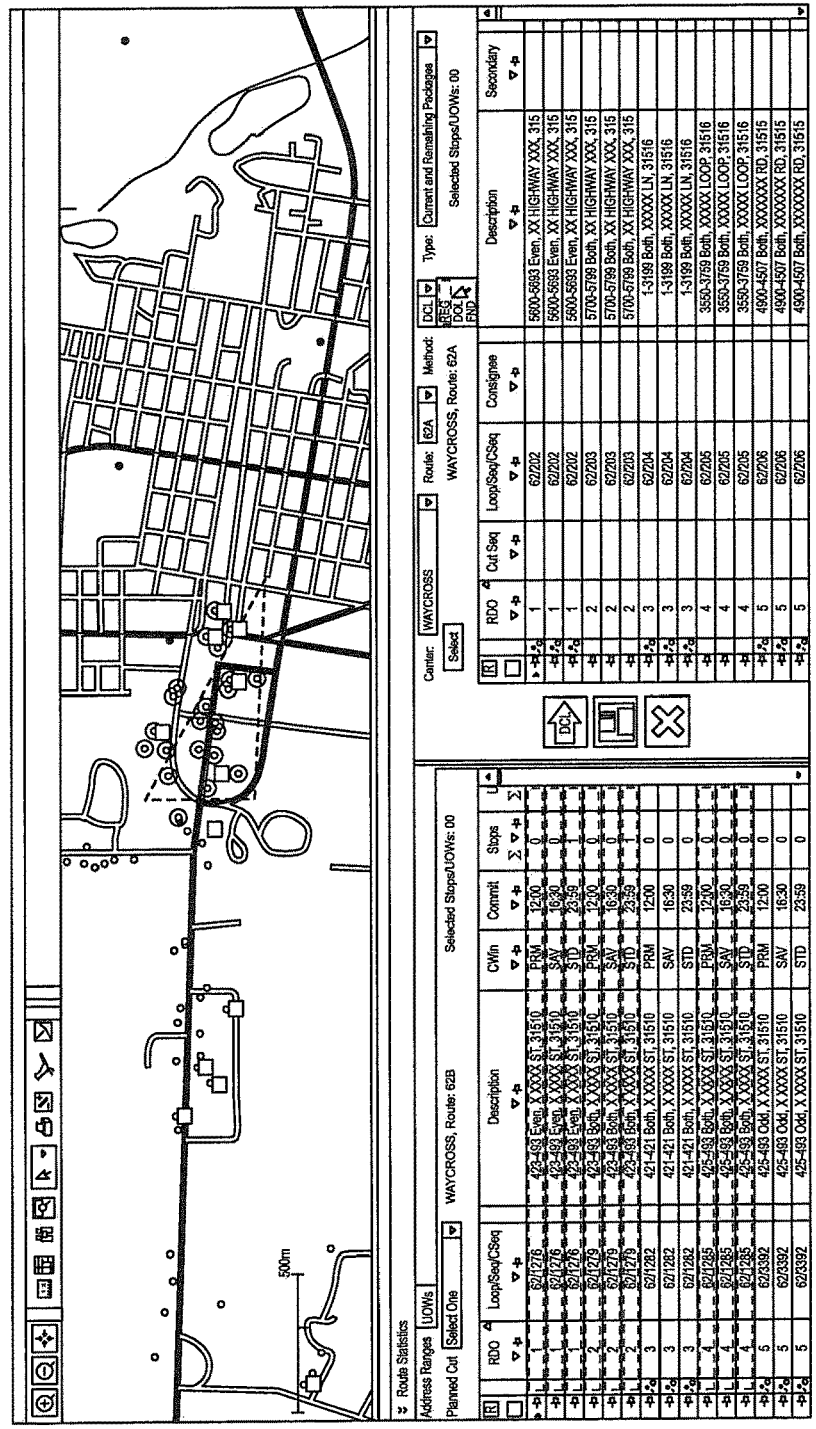
Figure 13:
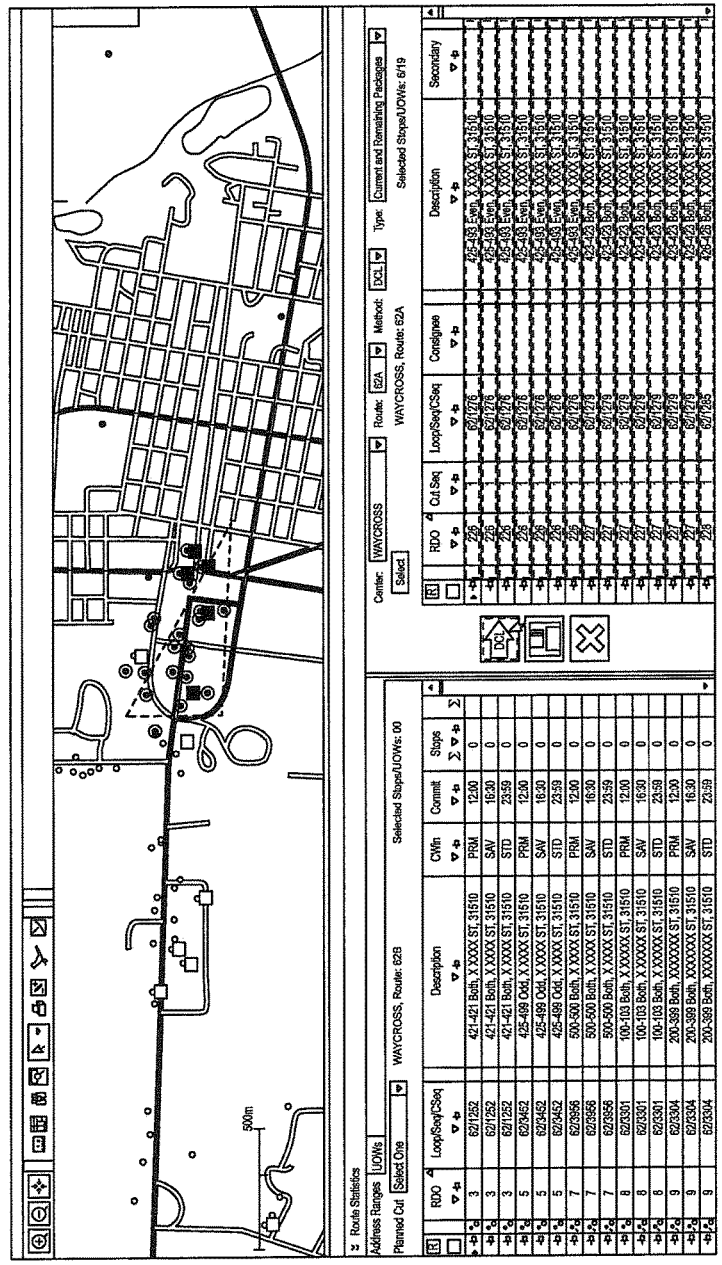

After receiving input selecting the items of work, the synchronized functionality of the route display area/portion 615 of the mapping interface 600 causes simultaneous display of the selected items of work (see FIG. 12) in the appropriate tab and grid. As shown in FIG. 12, the service points and/or UOWs are simultaneously highlighted in both the source route display area/portion 615 (e.g., the appropriate rows of the grid 620 are highlighted in grey) and the map display area/portion 610 (e.g., the appropriate blue icons are surrounded by green highlighted circles). Similarly, the route/region statistics grid 625 can cause simultaneous display of statistics for each route/region in the polygon—such as including a row with various statistics for each route/region being displayed via the map display area/portion 610.

After the items of work from the source route/region have been selected, the items of work can be moved/cut from the source route/region and be moved/added to the destination route/region. For example, in FIG. 12, a user (e.g., operating a user computing entity 140) can select or activate the blue arrow graphic, field, icon, image, indicator, control, button, function, and/or the like. In other embodiments, various different functionalities can be used.

In one embodiment, when a user move/cuts one or more items of work from a source route/region to a destination route/region, the mapping/routing platform of the mapping/routing computing entity 110 can execute various steps to complete the move. For example, the mapping/routing computing entity 110 can confirm that a user with the proper security or access rights is requesting the move. If a user with the appropriate security or access rights has requested the move, the mapping/routing platform can execute the request.

a. Modifying (Add/Cut) with Active Address Tab

As previously indicated, if a user with the appropriate security or access rights has requested to move items of work, the mapping/routing platform can execute the request and perform different steps or operations depending on the type. For example, the type may be "current and remaining items of work" and/or "remaining items of work only." To execute the request when the active source route/region tab is an address range tab 618 and the type is current and remaining items of work, the mapping/routing computing entity 110 will remove the selected address ranges or service points from the source route/region and insert them into the destination route/region. In this case, all of the UOWs (both forecasted and actual) assigned to or associated with the selected address ranges or service points will be removed from the UOW source route/region and inserted into the destination route/region. To execute the request when the active source route/region tab is an address range tab 618 and the type is remaining items of work only and the actual UOWs already exist for the address ranges or service points, the mapping/routing computing entity 110 causes display of the selected address ranges in the address ranges source route/region grid 620 a light gray background color to disable future add/cuts by address range for these address ranges. The mapping/routing computing entity 110 also copies the selected address ranges into the destination route/region. In this case, the actual UOWs will remain in the UOW source route/region grid 620, but the forecasted UOWs will be removed and inserted into the destination route/region. However, if actual UOWs doe not exist for the selected address ranges, the mapping/routing computing entity 110 will remove the selected address ranges or service points from the source route/region and insert them into the destination route/region.

b. Modifying (Add/Cut) with Active UOW Tab

As previously indicated, if a user with the appropriate security or access rights has requested to move items of work (e.g., service points, stops, addresses, UOWs, EOWs, pickups, and/or the like), the mapping/routing platform can execute the request. To execute the request when the active source route/region tab is a UOW tab 618, the mapping/routing computing entity 110 will leave the address ranges assigned to or associated with the selected UOWs in the address ranges source route/region grid 620. If the Address Range was a "work only" (only UOWs are being moved) address range (light gray background color), the mapping/routing computing entity 110 will remove the address ranges if there are no remaining UOWs for that Address Range. The parent address ranges will be copied into the destination route/region and the corresponding icons will be colored light gray (or another color) to signify that the range is a work only address range. The selected UOW rows will be removed from the UOW list source route/region grid 620 and inserted into the destination route/region.

Further, in one embodiment, the mapping/routing computing entity 110 can calculate a handling instruction (HIN) value using HIN rules on the created work only address range in the destination route/region. The HIN may comprise data that indicates the disposition of a UOW in the preload or load operations, including load name and a shelf/floor position. The mapping/routing computing entity 110 can propagate the HIN to the UOWs that have been added/cut. As will be recognized, a variety of other approaches and techniques can be adapted to various needs and circumstances.

c. Modifying (Add/Cut) with Active Pickup Tab

As previously indicated, if a user with the appropriate security or access rights has requested to move items of work, the mapping/routing platform can execute the request. To execute the request when the active source route/region tab is a pickup tab 618, the mapping/routing computing entity 110 can remove the selected pickups from the pickup list source route grid and insert them into the destination route/region. In this case, all pickups add/cut will receive the primary load of the destination route/region. Further, the pickup tab will be selected for the destination route, and those pickups that were moved will be highlighted. As will be recognized, a variety of other approaches and techniques can be adapted to various needs and circumstances.

d. Modifying (Add/Cut) with Active EOW Tab

As previously indicated, if a user with the appropriate security or access rights has requested to move items of work, the mapping/routing platform can execute the request. To execute the request when the active source route/region tab is an EOW tab 618, the mapping/routing computing entity 110 can will remove the selected EOWs from the EOW list source route/region grid and insert them into the destination route/region. As described above, the EOWs that have been add/cut will receive the primary load of the destination route/region. The EOWs tab 618 will be selected for the destination route, and those EOWs that were just moved will be highlighted. As will be recognized, a variety of other approaches and techniques can be adapted to various needs and circumstances.

e. Modifying (Moving) Items of Work within a Route/Region

In one embodiment, once users have completed an add/cut action, they can utilize the manual edit feature to manually move newly inserted work anywhere inside the destination route/region address grid 620. The mapping/routing computing entity 110 can initiate the manual when users (e.g., operating a user computing entity 110) select any of the newly inserted address ranges they wish to move. To edit the location of the work, a user can hold the Ctrl key and use the left mouse button to drag-and-drop that work from its original position to the desired new position inside the destination route's address range's grid 620. During the drag operation (before releasing the left mouse button), users can determine their current row position via a small black arrow indicator (not shown) inside the row selector column (the left-most column in the corresponding grid). When users arrive at their desired new location, they will complete their "drop" operation by releasing the left mouse button, which causes the selected address range rows to be moved from their original position to the new position in the corresponding grid. Although, the preceding was described using the Ctrl key and the left mouse, this example was simply provided for understanding aspects of the embodiment and is in no way limiting to embodiments of the invention.

2. Modifying (Add/Cut) the Same Routes/Regions

In one embodiment, a user can modify an exiting route/region by selecting a single route/region as both the source and destination route/region (Blocks 530 and 535) manually, semi-automatically, and/or fully automatically. In such a case, the mapping/routing computing entity 110 can execute the same steps or operations as described in the section entitled 1. Adds and Cuts on Different Routes/Regions and the corresponding subsections. However, in such a case, the route/region statistics grid 625 and source route/region grid 625 can cause display of information/data differently that as previously described. In particular, the route/region statistics grid 625 will only display one row since there is only one route/region. The mapping/routing computing entity 110 can recalculate the information/data for the row and update it after each add/cut and manual edit. Further, the source route/region grids (e.g., address ranges, UOW, pickup, and EOW) will "mirror" the rows displayed in the destination route's grid. Thus, when an address range has been effectively moved to a different location inside the destination route/region grid, the address ranges source route/region grid will be updated to match the destination route/region. Likewise, the UOW list source route/region grid will be updated to reflect where the UOWs were moved.

As will be recognize, the source and address grids 620 for the corresponding destination routes/regions remain independent, just as they do when performing add/cuts to different routes. That is, the column filters and column options for any source grid may be different than those for the corresponding destination grid. Similarly, the map display area/portion 610 can display both the source and destination routes/regions.

IV. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method comprising:
receiving input identifying a geographic area in which to create a new route;
simultaneously causing display, via an interface comprising a map display area and a route display area, of at least a portion of the geographic area as a digital map via the map display area of the interface, wherein (a) the map display area and the route display area do not overlap, (b) the map display area and the route display area are synchronized, (c) the digital map comprises a plurality of service points represented on the digital map with each of the plurality of service points corresponding to a location comprising an address to which items are requested to be delivered to, and (d) the route display area comprises a grid comprising rows, (i) with a row for each of the plurality of service points, and (ii) each row comprising textual information for the corresponding service point;
receiving input selecting two or more of the plurality of service points displayed via the digital map for the new route;
assigning the selected two or more of the plurality of service points to the new route in the geographic area, wherein the new route comprises at least the selected two or more of the plurality of service points to be visited as part of a delivery route; and
determining a plurality of statistics which are indicated in a row of a statistics grid of the route display area, the statistics correspond to statistical information for the new route to balance a workload for delivering one or more items.

2. The method of claim 1, wherein each service point of the plurality of service points is represented on the digital map as an icon.

3. The method of claim 1, wherein:
at least a portion of the statistical information comprises visible indicia indicating a number of units of work, pertaining to assigned pickups and deliveries, for the new route.

4. The method of claim 1, wherein prior to assigning the selected two or more of the plurality of service points, the method further comprises:
responsive to receiving the input selecting the two or more of the plurality of service points for the new route, for each of the selected two or more of the plurality of service points, simultaneously causing display (a) of an indication in the map display area that the selected service point has been selected and (b) of an indication in the row of the corresponding selected service point in the route display area that the selected service point has been selected.

5. The method of claim 4, wherein, for each of the selected two or more of the plurality of service points, (a) the indication in the map display area comprises highlighting, with a first color, two or more icons that represent the selected two or more of the plurality of service points and (b) the indication in the route display area comprises highlighting, with a second color, the corresponding row.

6. The method of claim 1, wherein the input selecting the two or more of the plurality of service points comprises input from a user drawing a polygon around the two or more of the plurality of service points in the map display area.

7. An apparatus comprising at least one processor and at least one memory including program code, the at least one memory and the program code configured to, with the processor, cause the apparatus to at least:
receive input identifying a geographic area in which to create a new route;
simultaneously cause display, via an interface comprising a map display area and a route display area, of at least a portion of the geographic area as a digital map via the map display area of the interface, wherein (a) the map display area and the route display area do not overlap, (b) the map display area and the route display area are synchronized, (c) the digital map comprises a plurality of service points represented on the digital map with each of the plurality of service points corresponding to a location comprising an address to which items are requested to be delivered to, and (d) the route display area comprises a grid comprising rows, (i) with a row for each of the plurality of service points, and (ii) each row comprising textual information for the corresponding service point;
receive input selecting two or more of the plurality of service points displayed via the digital map for the new route;
assign the selected two or more of the plurality of service points to the new route in the geographic area, wherein the new route comprises at least the selected two or more of the plurality of service points to be visited as part of a delivery route; and
determine a plurality of statistics which are indicated in a row of a statistics grid of the route display area, the statistics correspond to statistical information for the new route to balance a workload for delivering one or more items.

8. The apparatus of claim 7, wherein each service point of the plurality of service points is represented on the digital map as an icon.

9. The apparatus of claim 7, wherein:
at least a portion of the statistical information comprises visible indicia indicating a number of units of work, pertaining to assigned pickups and deliveries, for the new route.

10. The apparatus of claim 7, wherein prior to assign the selected two or more of the plurality of service points, the memory and the program code are further configured to, with the processor, cause the apparatus to:
responsive to receiving the input selecting the two or more of the plurality of service points for the new route, for each of the selected two or more of the plurality of service points, simultaneously cause display (a) of an indication in the map display area that the selected service point has been selected and (b) of an indication in the row of the corresponding selected service point in the route display area that the selected service point has been selected.

11. The apparatus of claim 10, wherein, for each of the selected two or more of the plurality of service points, (a) the indication in the map display area comprises highlighting a corresponding icon and (b) the indication in the route display area comprises highlighting the corresponding row.

12. The apparatus of claim 7, wherein the input selecting the two or more of the plurality of service points comprises input from a user drawing a polygon around the two or more of the plurality of service points in the map display area.

13. A computer program product comprising at least one non-transitory computer-readable storage medium having computer-readable program code stored therein, the computer-readable program code executable by one or more processors to cause the one or more processors to:
receive input identifying a geographic area in which to create a new route;
simultaneously cause display, via an interface comprising a map display area and a route display area, of at least a portion of the geographic area as a digital map via the map display area of the interface, wherein (a) the map display area and the route display area do not overlap, (b) the map display area and the route display area are synchronized, (c) the digital map comprises a plurality of service points represented on the digital map with each of the plurality of service points corresponding to a location comprising an address to which items can be delivered, and (d) the route display area comprises a grid comprising a plurality of rows, (i) each row of the plurality of rows corresponding to a particular service point of the plurality of service points, the each row further corresponding to a unique address of the particular service point, wherein the plurality of rows are each associated with different addresses, and (ii) the each row comprising textual information for the particular service point;
receive input selecting two or more of the plurality of service points displayed via the digital map for the new route;
assign the selected two or more of the plurality of service points to the new route in the geographic area, wherein the new route comprises at least the selected two or more of the plurality of service points to be visited as part of a delivery route; and
determine a plurality of statistics which are indicated in a row of the grid of the route display area, the statistics correspond to statistical information for the new route.

14. The computer program product of claim 13, wherein each service point of the plurality of service points is represented on the digital map as an icon.

15. The computer program product of claim 13, wherein:
at least a portion of the statistical information comprises visible indicia indicating a number of units of work, pertaining to assigned pickups and deliveries, for the new route.

16. The computer program product of claim 13, wherein prior to assign the selected two or more of the plurality of service points, the one or more processors is further caused to:
responsive to receiving the input selecting the two or more of the plurality of service points for the new route, for each of the selected two or more of the plurality of service points, simultaneously cause display (a) of an indication in the map display area that the selected service point has been selected and (b) of an indication in the row of the corresponding selected service point in the route display area that the selected service point has been selected.

17. The computer program product of claim 16, wherein, for each of the selected two or more of the plurality of service points, (a) the indication in the map display area comprises highlighting a corresponding icon and (b) the indication in the route display area comprises highlighting the corresponding row.

18. The computer program product of claim 13, wherein the input selecting the two or more of the plurality of service points comprises input from a user drawing a polygon around the two or more of the plurality of service points in the map display area.

\* \* \* \* \*

UNITED STATES PATENT AND TRADEMARK OFFICE
CERTIFICATE OF CORRECTION

PATENT NO.         : 10,323,955 B2
APPLICATION NO.    : 15/392105
DATED              : June 18, 2019
INVENTOR(S)        : Robert Santilli et al.

It is certified that error appears in the above-identified patent and that said Letters Patent is hereby corrected as shown below:

In the Specification

Column 35, Line 31: Please remove "doe" and replace with --does--.
Column 36, Line 56: Please remove "exiting" and replace with --existing--.

Signed and Sealed this
Sixth Day of August, 2019

Andrei Iancu
*Director of the United States Patent and Trademark Office*